United States Patent
Ishihara et al.

(10) Patent No.: US 6,236,477 B1
(45) Date of Patent: May 22, 2001

(54) OPTICAL TRANSMISSION AND RECEIVING MODULE

(75) Inventors: Takehisa Ishihara; Hideki Miyuki, both of Yamatokoriyama; Kazuhito Nagura, Kashiwara; Kentaro Terashioma, Kitakatsuragi-gun; Hiroshi Nakatsu, Tenri, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/481,430

(22) Filed: Jan. 12, 2000

(30) Foreign Application Priority Data

Jan. 12, 1999 (JP) .................................... 11-005872
Jul. 14, 1999 (JP) .................................... 11-201047

(51) Int. Cl.$^7$ ............................. G02B 27/12; G02B 27/10
(52) U.S. Cl. .............................. 359/40; 359/618; 359/619
(58) Field of Search .................................. 359/618, 619, 359/629, 640; 385/36

(56) References Cited

U.S. PATENT DOCUMENTS

| 4,343,532 | * | 8/1982 | Palmer | 385/36 |
| 5,321,781 | * | 6/1994 | Cox | 385/36 |
| 5,592,333 | * | 1/1997 | Lewis | 359/628 |

FOREIGN PATENT DOCUMENTS

| 7-248429 | * | 9/1995 | (JP) . |
| 8-15582 | * | 1/1996 | (JP) . |

* cited by examiner

Primary Examiner—Ricky Mack
(74) Attorney, Agent, or Firm—Dike, Bronstein, Roberts & Cushman, LLP; David G. Conlin; George W. Hartnell, III

(57) ABSTRACT

An optical transmission and receiving module includes a light source; a light receiving element; and a light branching element for causing signal light from the light source to be incident on an optical fiber and causing signal light output from the optical fiber to be incident on the light receiving element. The light branching element includes a prism array including a plurality of triangular prisms arranged at substantially an identical pitch on a plane extending substantially perpendicular to an imaginary line connecting the light source and the light receiving element.

16 Claims, 20 Drawing Sheets

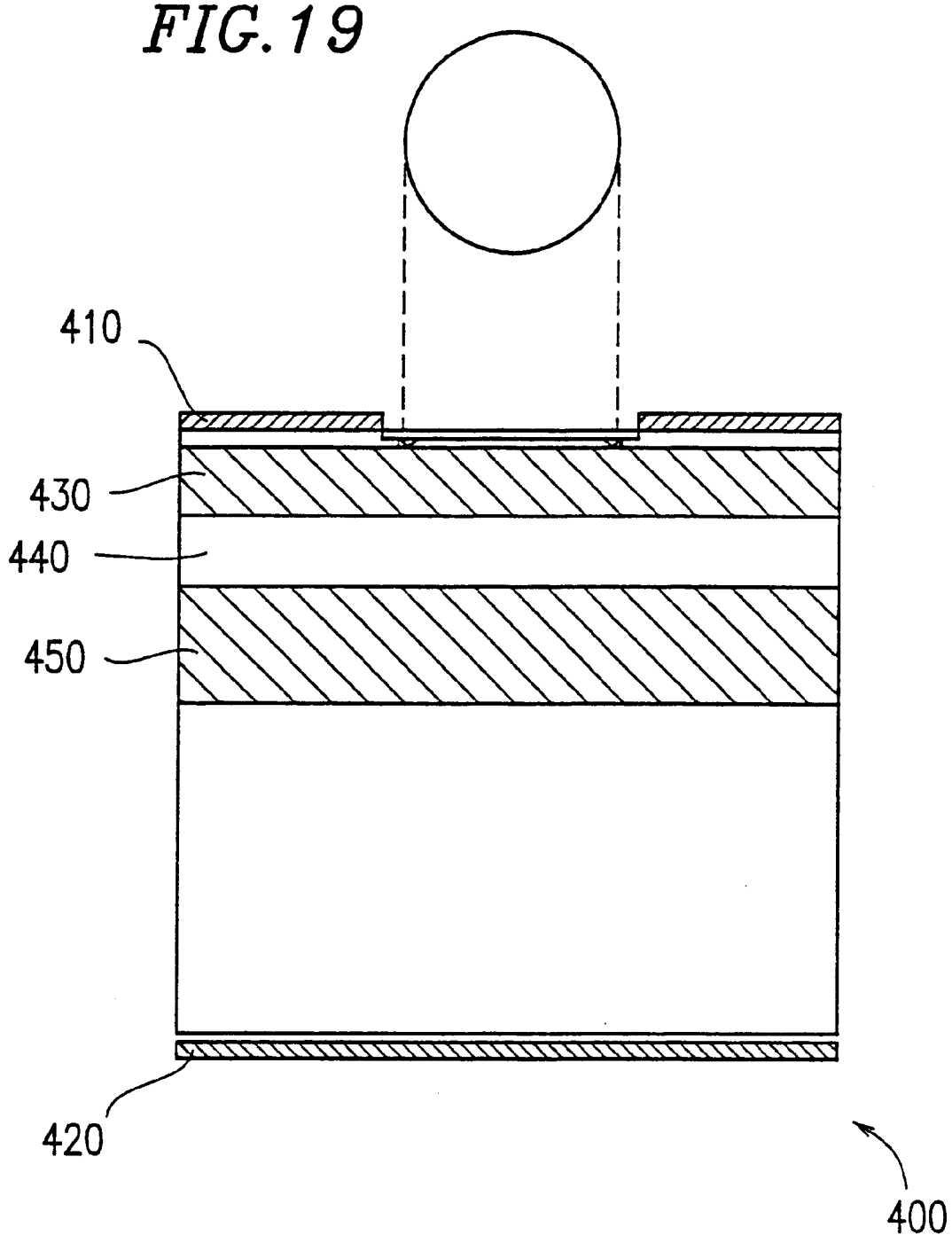

OPTICAL TRANSMISSION AND RECEIVING MODULE

BACKGROUND OF THE INVENTION

1. Field of the Invention

The present invention relates to an optical transmission and receiving module usable for an optical communication system for transmitting and receiving optical signals through an optical fiber, and specifically to an optical transmission and receiving module for realizing high speed transfer based on, for example, IEEE1394 and USB2.

2. Description of the Related Art

Japanese Laid-Open Publication No. 7-248429 discloses an optical transmission and receiving module 1000 as shown in FIG. 30. The optical transmission and receiving module 1000 operates in the following manner.

Transmission signal light which is emitted by a light emitting element 1001 is transmitted through a cover glass 1060 attached to a package and branched into two light components by a Foucault prism 1003. The light components are collected to point A and point B by a lens 1004. That is, only one of the light components is incident on an optical fiber 1007.

Receiving signal light which is output by the optical fiber 1007 is collected by the lens 1004 and then incident on the Foucault prism 1003. The light is branched into two light components by the Foucault prism 1003 and then transmitted through the cover glass 1060. One of the two light components is incident on a light receiving element 1002.

Japanese Laid-Open Publication No. 8-15582 discloses another optical transmission and receiving module 2000 as shown in FIG. 31. The optical transmission and receiving module 2000 operates in the following manner.

Transmission signal light which is emitted by a semiconductor laser 2002 is collimated by a lens 2004. The light is then incident on a holographic diffraction grating 2005 to be branched into a zeroth-order light component and a first-order light component. Only the zeroth-order light component, which is collected, is incident on an optical fiber 2006.

Receiving signal light which is output by the optical fiber 2006 is incident on the holographic diffraction grating 2005 and branched into a zeroth-order light component and a first-order light component. Both light components are collimated. Only the first-order light component, which is collected by the lens 2004, is incident on a light receiving element 2003.

The optical transmission and receiving module 1000 shown in FIG. 30 has the following problems.

(1) Since the vertex angle of the Foucault prism 1003 is as small as 2° to 3°, the light emitting element 1001 and the light receiving element 1002 are inevitably located close to each other. Accordingly, the light receiving element 1002 needs to be located far from a focal point 1008 of the receiving signal light. Therefore, the receiving signal light needs to be detected in an expanded state. This requires the light receiving element 1002 to be larger. Such a large light receiving element 1002 has a capacitance which is too large to perform high speed transmission.

Although it is conceivable to increase the vertex angle of the Foucault prism 1003 in order to extend the distance between the light emitting element 1001 and the light receiving element 1002, such an arrangement requires the Foucault prism 1003 to be thicker. This makes difficult the size reduction of the optical transmission and receiving module 1000.

(2) The Foucault prism 1003 needs to be located at a high precision since when the Foucault prism 1003 is not on an optical axis of the optical fiber 1007, the branching ratio of the Foucault prism 1003 is changed from the designed ratio.

(3) When an RCLED (resonant cavity light emission diode) is used for the light emitting element 1001, the light utilization factor is reduced since the peak radiation angle of the light generated at the high efficiency RCLED is not 0°.

The optical transmission and receiving module 2000 shown in FIG. 31 has the following problems.

(1) The wavelength of the light changes in accordance with the temperature of the semiconductor laser 2002. When the wavelength of the light incident on the holographic diffraction grating 2005 changes, the collection position of the light and the diameter of the light spot incident on the light receiving element 2003 change. Thus, the light receiving sensitivity of the optical transmission and receiving module 2000 is reduced.

(2) Since the diffracted light from the holographic diffraction grating 2005 includes a high-order diffracted light component, which is unusable for communication, the light utilization factor of the optical transmission and receiving module 2000 is reduced.

(3) Production of a sawtooth-shaped diffraction grating, which is required to suppress the high-order diffracted light component, is difficult due to the microscopic pitch of the grating.

(4) When an RCLED is used for the light emitting element instead of the semiconductor laser 2002, the light utilization factor is reduced since the peak radiation angle of the light generated at the high efficiency RCLED is not 0°.

SUMMARY OF THE INVENTION

According to one aspect of the invention, an optical transmission and receiving module includes a light source; a light receiving element; and a light branching element for causing signal light from the light source to be incident on an optical fiber and causing signal light output from the optical fiber to be incident on the light receiving element. The light branching element includes a prism array including a plurality of triangular prisms arranged at substantially an identical pitch on a plane extending substantially perpendicular to an imaginary line connecting the light source and the light receiving element.

In one embodiment of the invention, the optical transmission and receiving module fulfills $d/2 > P >> \lambda/\sin\theta$ where d is a diameter of the optical fiber, $\lambda$ is a wavelength of light from the light source, P is a pitch of the plurality of triangular prisms, and $\theta$ is a deflection angle of the plurality of triangular prisms.

In one embodiment of the invention, each of the plurality of triangular prisms has an isosceles triangular cross-section.

In one embodiment of the invention, each of the plurality of triangular prisms has a vertex angle in the range of about −20° to 60°.

In one embodiment of the invention, the optical transmission and receiving module fulfills:

$$1/\tan(1/\alpha tx) = 1/\tan(1/\alpha rx) + \tan(\alpha rx - \arcsin(\alpha rx/n))$$

where $\alpha tx$ is one vertex angle, $\alpha rx$ is another vertex angle, and n is the refractive index of each of the plurality of triangular prisms.

In one embodiment of the invention, the optical transmission and receiving module fulfills $\Phi > B$ where $\Phi$ is the diameter of the signal light output from the optical fiber to the prism array, and B is the length of a base of each of the plurality of triangular prisms.

In one embodiment of the invention, the prism array is formed of acrylic.

In one embodiment of the invention, the light source includes a light emitting element which is formed a semiconductor laser element.

In one embodiment of the invention, the light source includes a light emitting element which is formed of a resonant cavity light emission diode.

In one embodiment of the invention, the light source includes a light emitting element, and a deflection angle of the light branching element and a peak radiation angle of radiation light from the light emitting element are substantially equal to each other.

In one embodiment of the invention, the light source includes a light emitting element, the light emitting element includes a first collection lens, the light receiving element includes a second collection lens, and the optical transmission and receiving module further includes at least one collimator lens provided between the prism array, and the first collection lens and the second collection lens, the at least one collection lens being parallel to the prism array.

In one embodiment of the invention, the prism array and the collimator lens are integrally formed.

In one embodiment of the invention, a vertex angle $\alpha tx$ is different from $\alpha rx$, where $\alpha tx$ is one vertex angle and $\alpha rx$ is another vertex angle of each of the plurality of triangular prisms.

In one embodiment of the invention, the prism array is divided into a plurality of prism sections by lines perpendicular to troughs and peaks thereof, and the troughs and peaks are positionally offset on a prism section-by-prism section basis.

In one embodiment of the invention, the troughs and peaks in different prism sections have different lengths from one another.

In one embodiment of the invention, the prism array includes troughs having random depth and peaks having random heights.

Thus, the invention described herein makes possible the advantages of providing a compact, easy-to-produce optical transmission and receiving module having a satisfactory light utilization factor.

These and other advantages of the present invention will become apparent to those skilled in the art upon reading and understanding the following detailed description with reference to the accompanying figures.

BRIEF DESCRIPTION OF THE DRAWINGS

FIG. 19 is a view showing an exemplary cross-section of an RCLED in a fourth example according to the present invention;

DESCRIPTION OF THE PREFERRED EMBODIMENTS

Hereinafter, the present invention will be described by way of illustrative examples with reference to the accompanying drawings.

EXAMPLE 1

Figure 1:
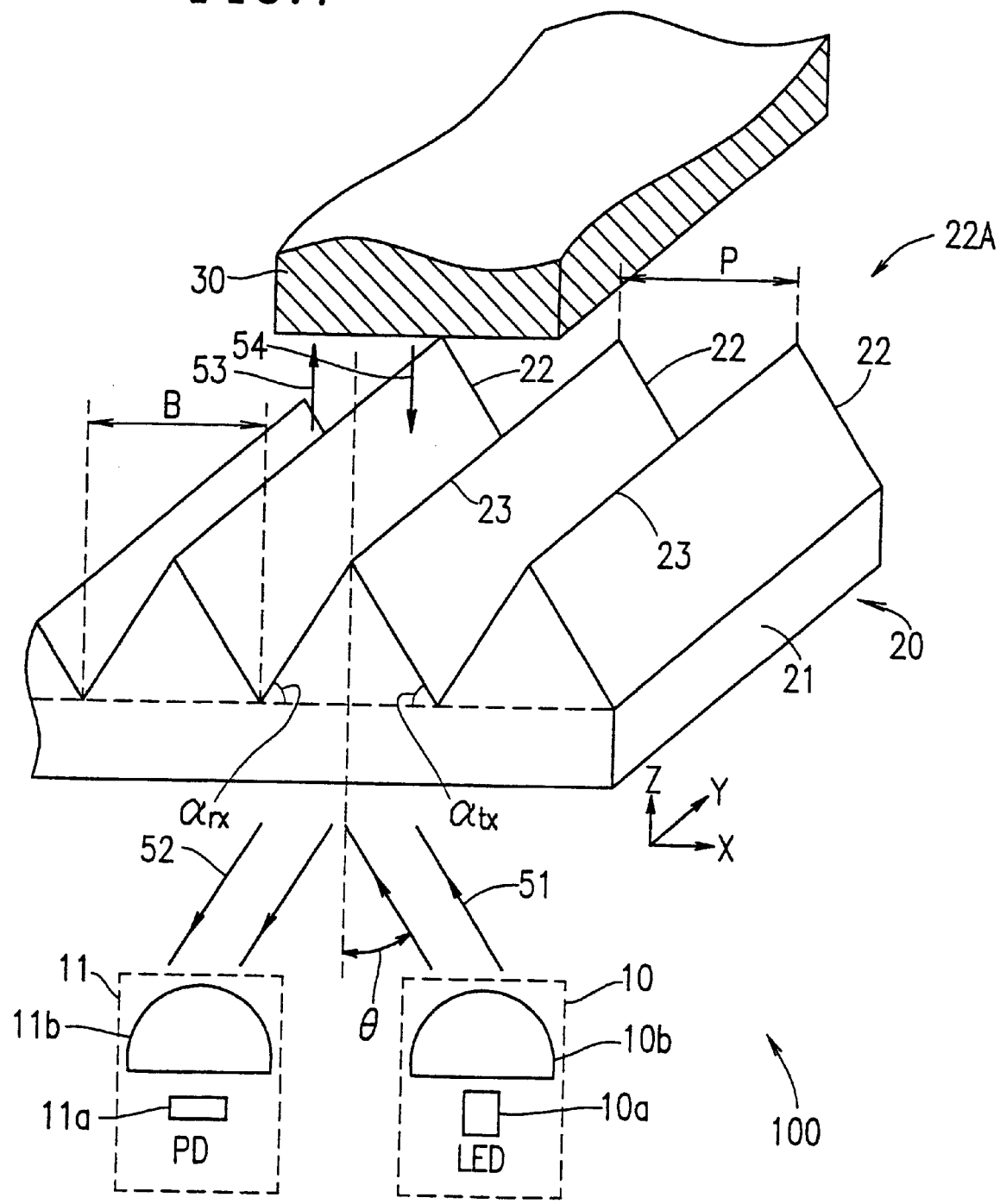
FIG. 1 is a schematic view of an optical transmission and receiving module in a first example according to the present invention.

FIG. 1 is a schematic view of an optical transmission and receiving module 100 in a first example according to the present invention.

The optical transmission and receiving module 100 includes a light source 10, a light receiving element 11 and a light branching element 20.

The light source 10 outputs transmitting light 51 to the light branching element 20. The light source 10 includes, for example, a light emitting diode 10a and a lens 10b for collecting light output from the light emitting diode 10a.

The light receiving element 11 receives receiving light 52 from the light branching element 20. The light receiving element 11 includes, for example, a photodiode 11a and a lens 11b for collecting the receiving light 52.

An imaginary line connecting the light source 10 and the light receiving element 11 extends in a direction represented by arrow X (referred to as "direction X"). A direction represented by arrow Z (referred to as "direction Z", described below) is substantially perpendicular to direction X, and a direction represented by arrow Y (referred to as "direction Y", described below) is substantially perpendicular to direction X and direction Z.

The light branching element 20 outputs the transmitting light 51 from the light source 10 to an optical fiber 30 as signal light 53, and outputs signal light 54 received from the optical fiber 30 to the light receiving element 11 as the receiving light 52. The light branching element 20 includes, for example, a base body 21 and a prism array 22A including a plurality of prisms 22.

The base body 21 is formed of, for example, PET (polyethylene telephthalate), and the prisms 22 are formed of, for example, of acrylic.

Each prism 22 has a substantially triangular cross-section when cut perpendicularly to direction Y. A side 23 of the triangular prism 22 which is parallel to the base body 21 extends in direction Y. The prisms 22 are arranged in a manner that a distance between the sides 23 of the adjacent prisms 22 is pitch P. The vertex angle of the triangle toward which the transmitting light 51 is transmitted from the light source 10 is represented as αtx, and the vertex angle of the triangle from which the receiving light 52 is received by the light receiving element 11 is represented as αrx.

Letter θ represents a deflection angle of the prism 22, which is made by direction Z and the transmitting light 51 and also by the direction Z and the receiving light 52.

The optical transmission and receiving module 100 preferably fulfills the condition of $P \gg \lambda/\sin\theta$. Under the condition of $P = \lambda/\sin\theta$, the light branching and deflection performed by the light branching element 20 is mostly influenced by diffraction.

When the condition of $P \gg \lambda/\sin\theta$ is fulfilled, the light branching and deflection performed by the light branching element 20 is mostly influenced by refraction. Such light branching and deflection is not significantly influenced by a change in the wavelength of the light from the light source 10, and thus a high-order diffracted light component is not generated. Therefore, the optical transmission and receiving module 100 has a satisfactory light utilization factor.

A holographic diffraction grating has an Abbe number of, for example, of −3.453. A prism array formed of acrylic has an Abbe number of 57. The optical transmission and receiving module 100 including the prism array 22A formed of acrylic is at least 10 times less sensitive to a change in the wavelength than an optical transmission and receiving module using a holographic diffraction grating.

The optical transmission and receiving module 100 preferably fulfills the condition of $\Phi > B$, where $\Phi$ indicates the diameter of a light spot of the signal light 54 output from the optical fiber 30 to the prism array 22A and also the diameter of a light spot of the signal light 53 output from the prism array 22A to the optical fiber 30, and B indicates the length of the base of the prism 22.

A change in the branching ratio (ratio of the light spot diameters of light components obtained by branching the incident light) caused by a positional offset of the prisms 22 is maximized when the positions of the prisms 22 are offset by 1/4 of pitch P. This will be described with reference to FIGS. 2 through 6.

Figure 2:
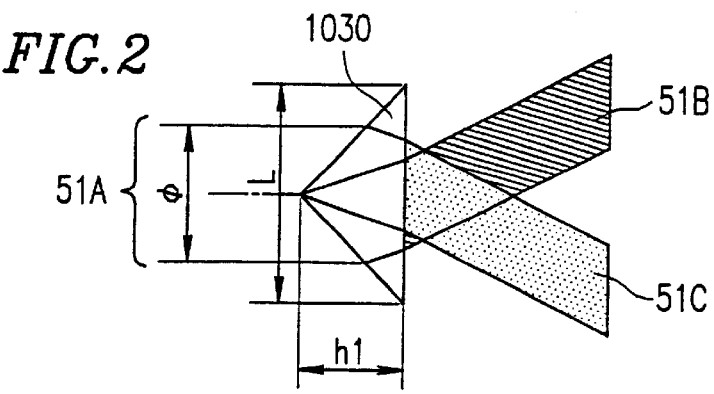
FIGS. 2 through 5 are schematic views comparing the prisms in a conventional example and the first example according to the present invention.
Figure 3:
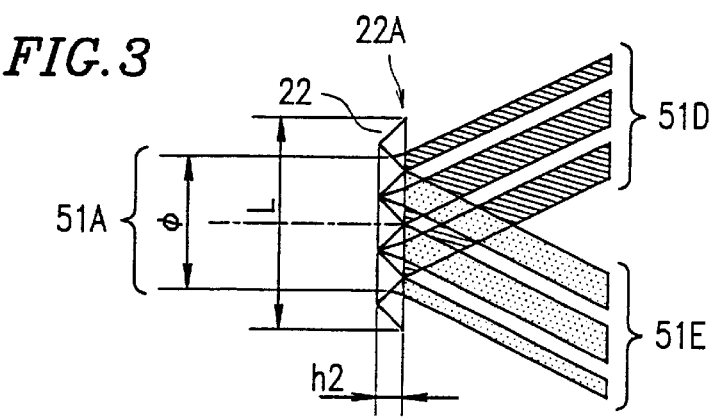
Figure 4:
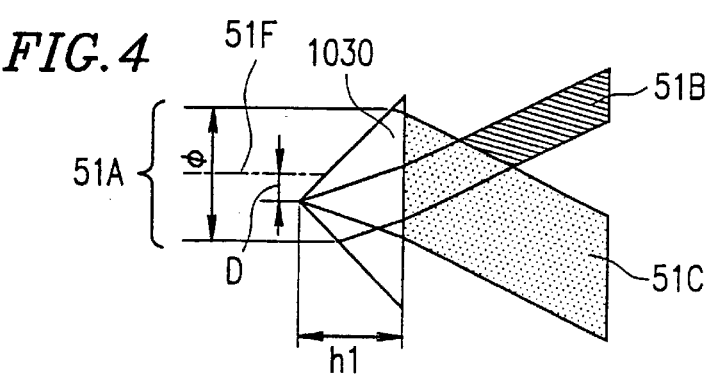
Figure 5:
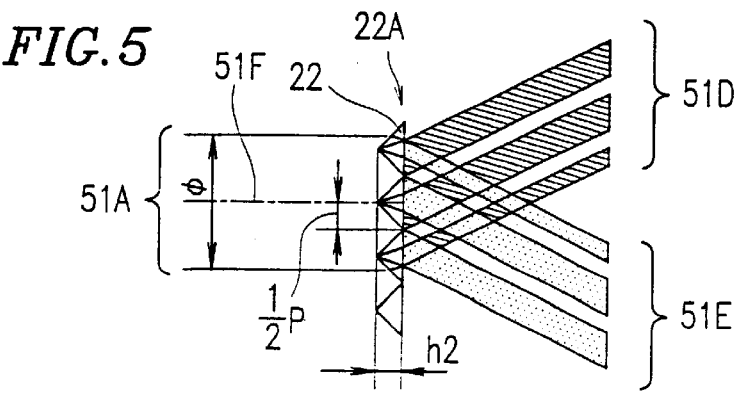
Figure 30:
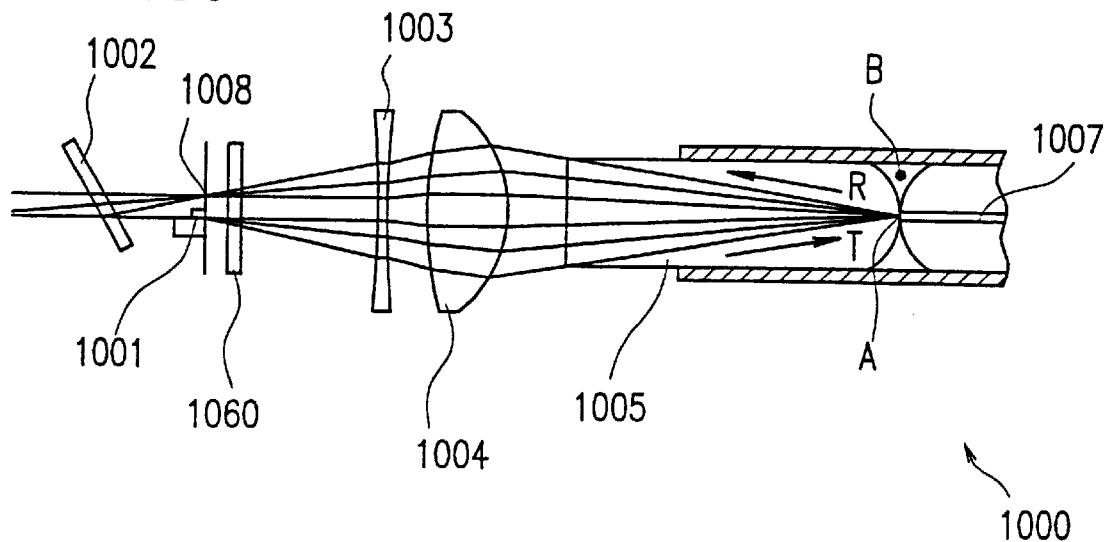
FIG. 30 is a view illustrating a conventional optical transmission and receiving module.

FIGS. 2 and 4 are diagrams illustrating that a light component 51A having a light spot diameter $\Phi$ is incident on a Foucault prism 1030, used independently (i.e., not in combination of a plurality of prisms) like the Foucault prism 1003 of the optical transmission and receiving module 1000 shown in FIG. 30, and branched into two light components 51B and 51C. FIGS. 3 and 5 are diagrams illustrating that the light component 51A having a light spot diameter $\Phi$ is incident on a prism array 22A of the optical transmission and receiving module 100 and branched into two light components 51D and 51E.

The Foucault prism 1030 and the prism array 22A have an identical size L.

In FIGS. 2 and 3, the Foucault prism 1030 and the prism array 22A both have a branching ratio of 1:1.

In FIG. 4 in which the Foucault prism 1030 is located below by distance D relative to a central axis 51F of the light component 51A, the branching ratio of the Foucault prism 1030 is offset from 1:1.

In the first example, when the prism array 22A is located below from the position shown in FIG. 3, the branching ratio of the prism array 22A is offset from 1:1. As shown in FIG. 5, the branching ratio of the prism array 22A is returned to 1:1 when the prism array 22A is located below by 1/2P relative to the central axis 51F.

Accordingly, when the prism array 22A fulfills the condition of $\Phi > B$, the optical transmission and receiving module 100 (FIG. 1) is less sensitive to a change in the wavelength than the optical transmission and receiving module 1000 including a prism such as the Foucault prism 1030 or 1003 (FIG. 30).

More preferably, the optical transmission and receiving module 100 fulfills the condition of $d/2 > P$. Here, d represents the diameter of the optical fiber 30.

When the optical transmission and receiving module 100 fulfills the condition of $\Phi > B$, height h2 of the prism array 22A is smaller than the height h1 of the Foucault prism 1030. In other words, the optical transmission and receiving module 100 fulfilling the condition of $\Phi > B$ can be lower or thinner than the optical transmission and receiving module 1000 including the Foucault prism 1030 or 1003.

Figure 6:
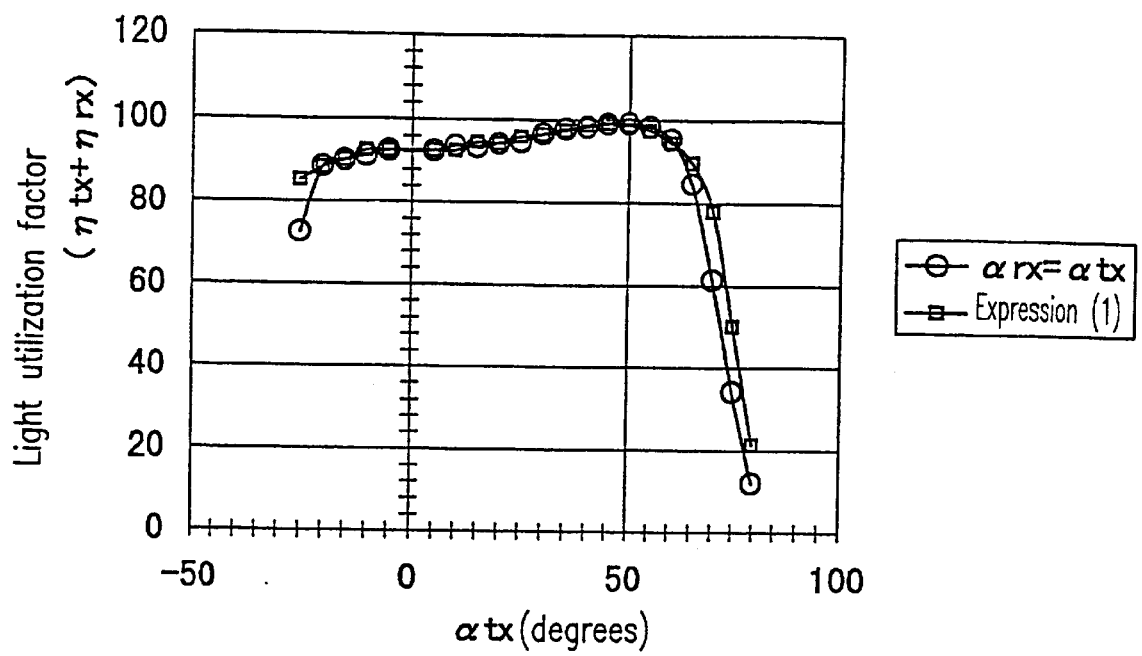
FIG. 6 is a graph illustrating the relationship between the vertex angle $\alpha tx$ of a prism and the light utilization factor obtained by simulation in the first example.
Figure 7:
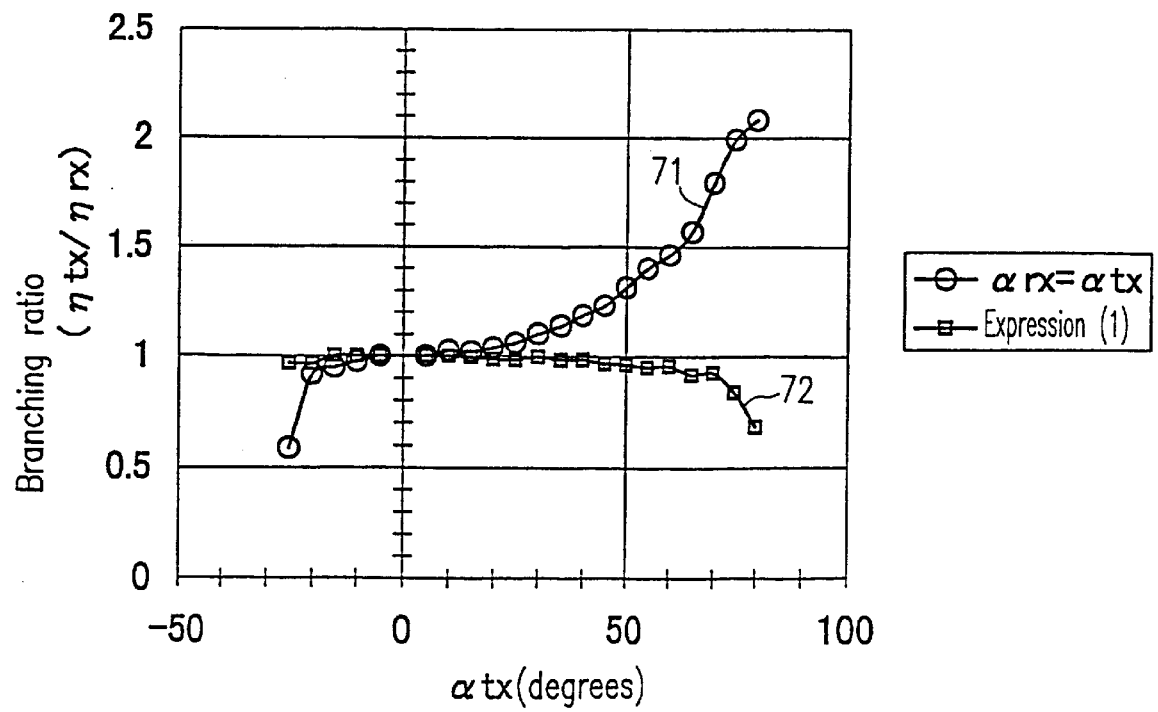
FIG. 7 is a graph illustrating the relationship between the vertex angle $\alpha tx$ of the prism and the branching ratio obtained by simulation in the first example.

FIG. 6 is a graph illustrating the relationship between the vertex angle αtx of the prism 22 and the light utilization factor obtained by simulation. FIG. 7 is a graph illustrating the relationship between the vertex angle αtx and the branching ratio obtained by simulation. The refractive index of the prism 22 is 1.5. The "expression (1)" in FIGS. 6 and 7 refers to the following expression.

$$1/\tan(1/\alpha tx) = 1/\tan(1/\alpha rx) + \tan(\alpha rx - \arcsin(\alpha rx/n))$$

As shown in FIG. 6, when the vertex angle αtx of the prism 22 is in the range of about −20° to about 60°, the light utilization factor, i.e., the sum of the transmittance ηtx when the light is transmitted and the transmittance ηrx when the light is received is about 85% or more.

Figure 8:
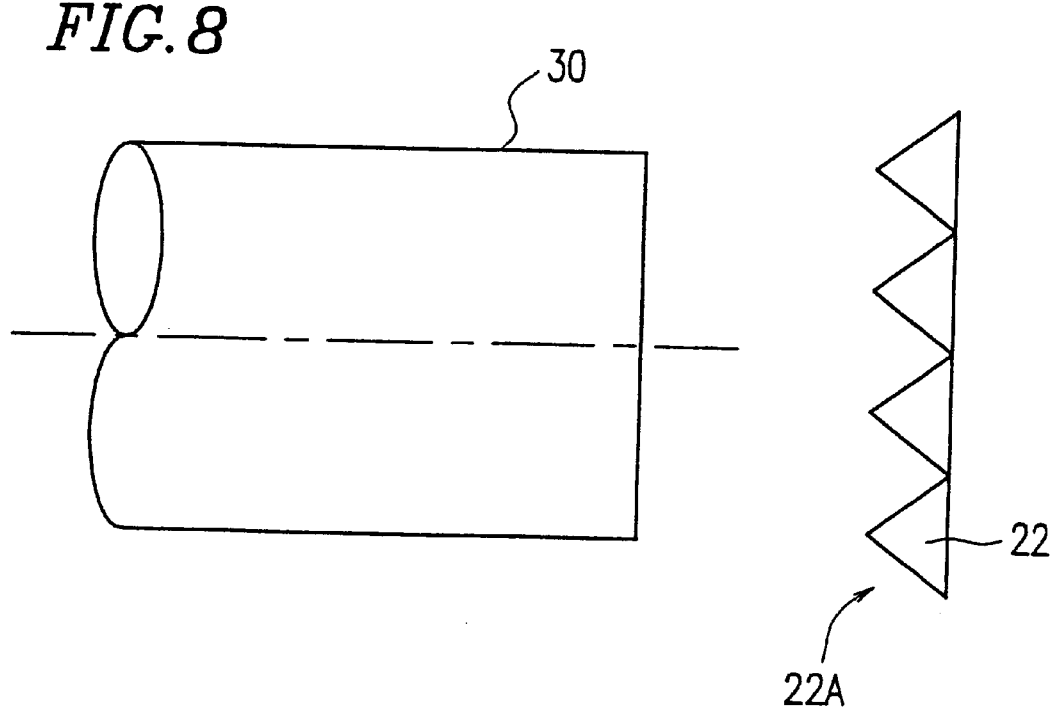
FIG. 8 is a diagram illustrating a positive vertex angle of the prism.
Figure 9:
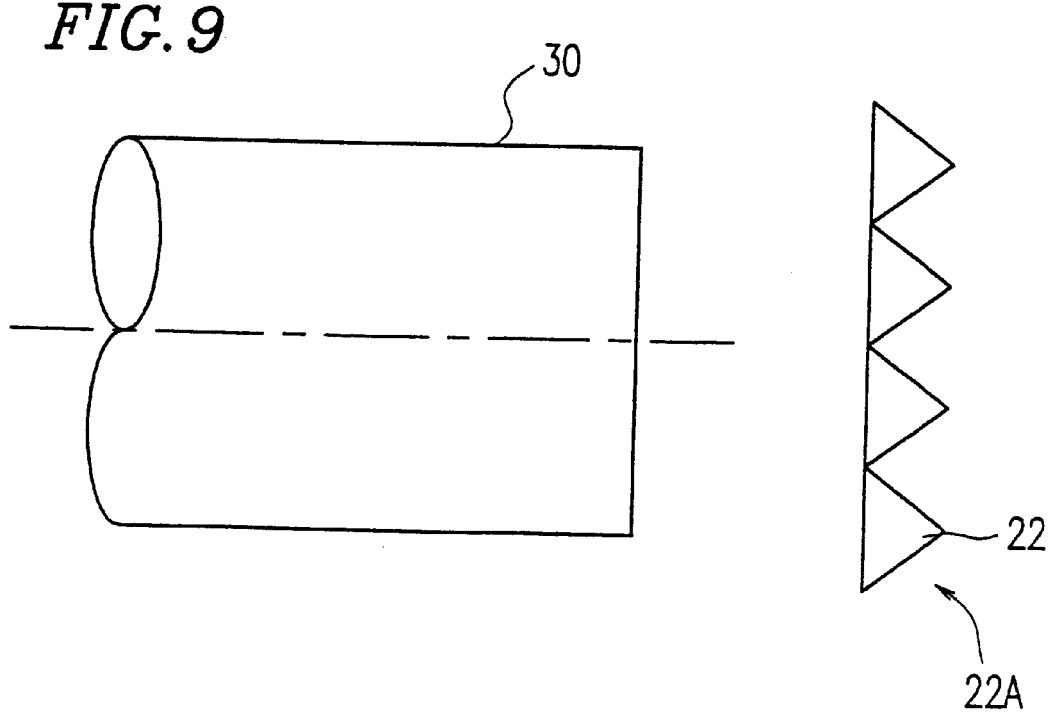
FIG. 9 is a diagram illustrating a negative vertex angle of the prism.

A positive value of the vertex angle αtx of the prism 22 means that the vertex of each prism 22 faces the optical fiber 30 as shown in FIG. 8. A negative value of the vertex angle αtx of the prism 22 means that the vertex of each prism 22 faces away from the optical fiber 30 as shown in FIG. 9.

The transmittance ηtx when the light is transmitted can be equal to the transmittance ηrx when the light is received.

In order to fulfill the condition of ηtx=ηrx, the optical transmission and receiving module 100 can fulfill the expression (1):

$$1/\tan(1/\alpha tx)=1/\tan(1/\alpha rx)+\tan(\alpha rx-\arcsin(\alpha rx/n))$$

for the following reasons.

Figure 10:
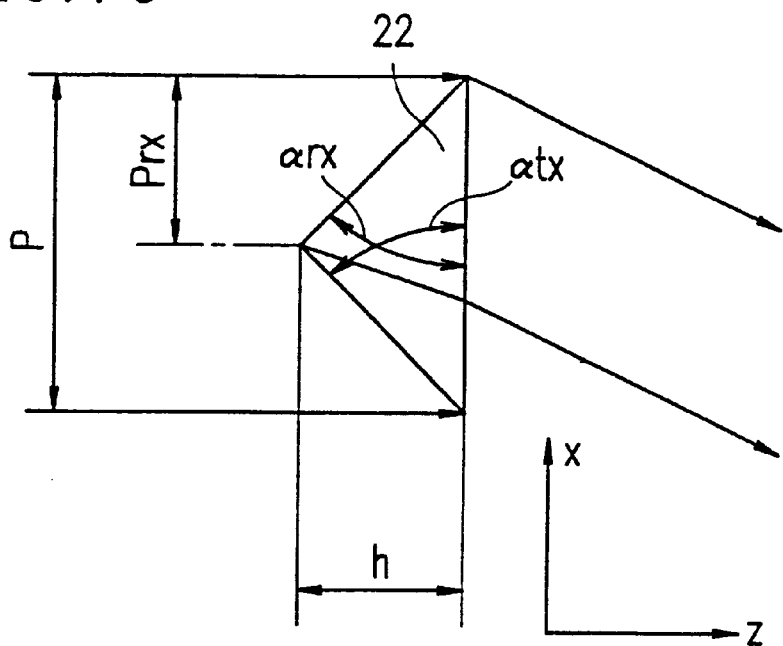
FIG. 10 is a diagram illustrating that the light incident on the prism is refracted toward a light receiving element.

FIG. 10 is a diagram illustrating that the light incident on the prism 22 is branched and refracted toward the light receiving element 11 (FIG. 1; right bottom in FIG. 10).

The transmittance of the light shown in FIG. 10 is represented by Prx/P when the Fresnel reflection at the refraction surface is ignored.

$$Prx/P=\{h/\tan\alpha rx\}/\{h(1/\tan\alpha tx+1/\tan\alpha rx)\}=\{1/\tan\alpha rx\}/\{1/\tan\alpha tx+1/\tan\alpha rx\},$$

where P=h(1/tanαtx+1/tanαrx), Prx=h/tanαrx, and h is the height of the prism 22.

Figure 11:
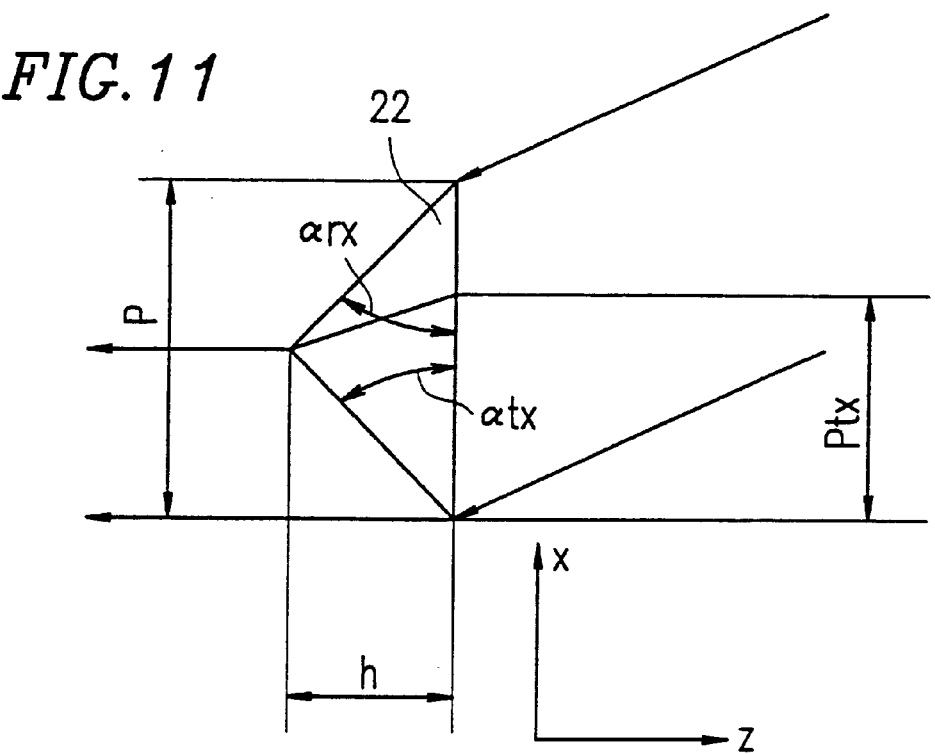
FIG. 11 is a diagram illustrating that the light incident on the prism is refracted toward an optical fiber.

FIG. 11 is a diagram illustrating that the light incident on the prism 22 is branched and refracted toward the optical fiber 30 (FIG. 1; left of FIG. 11).

The transmittance of the light shown in FIG. 11 is represented by Ptx/P when the Fresnel reflection at the refraction surface is ignored.

$$Ptx/P=\{1/\tan\alpha tx+\tan(\alpha rx-\arcsin(\alpha rx/n))\}/\{1/\tan\alpha tx+1/\tan\alpha rx\}$$

where Ptx=h/tanαtx+h(tan(αrx−arcsin(αrx/n))), and the n is the refractive index of the prism 22.

In order to realize ηtx=ηrx, following expression (1) needs to be fulfilled since Ptx=Prx: 1/tan(1/60 tx)=1/tan(1/αrx)+tan(αrx−arcsin(αrx/n)).

In FIG. 7, curve 71 is obtained when αrx=αtx, and curve 72 is obtained when expression (1) is fulfilled.

Curve 72 (expression (1) is fulfilled) fulfills ηtx=ηrx (ηtx/αrx=1) in a broader range than curve 71 (αrx=αtx).

Even when expression (1) is fulfilled, the branching ratio is ηtx/ηrx<1 when the vertex angle αtx exceeds a prescribed range since the Fresnel reflection cannot be ignored. In order to realize ηtx=ηrx in a relatively broad range of vertex angle, the vertex angle αtx needs to be determined in consideration of the Fresnel reflection.

When ηtx=ηrx, the light utilization factor between the same type of optical transmission and receiving modules is improved as described below.

In the following description, it is assumed there are two optical transmission and receiving modules. One of the optical transmission and receiving modules has a transmittance ηtxA when the light is transmitted and a transmittance ηrxA when the light is received. The other optical transmission and receiving module has a transmittance ηtxB when the light is transmitted and a transmittance ηrxB when the light is received.

Since the optical branching element of each optical transmission and receiving module is of a wave surface branching type, ηtxA+ηrxA=1, and ηtxB+ηrxB=1. Since both of the optical transmission and receiving modules are of the same type, ηtxA=ηtxB, and ηrxA=ηrxB. The light utilization factor is represented by ηtxAηrxB or ηtxBηrxA.

From the above-mentioned relationships, ηtxAηrxB= ηtxAηrxA=ηtxAx(1−ηtxA). The light utilization factor is highest when ηtxA=0.5, i.e., ηtxA=ηrxA.

The optical transmission and receiving module can have a branching ratio of other than 1:1 when required by the use thereof.

For example, there is a strong demand that a mobile communication terminal should consume less power during communication. In such a case, the branching ratio can be ηtx/ηrx>1 in order to improve the efficiency during transmission, which consumes more power than receiving.

Figure 12:
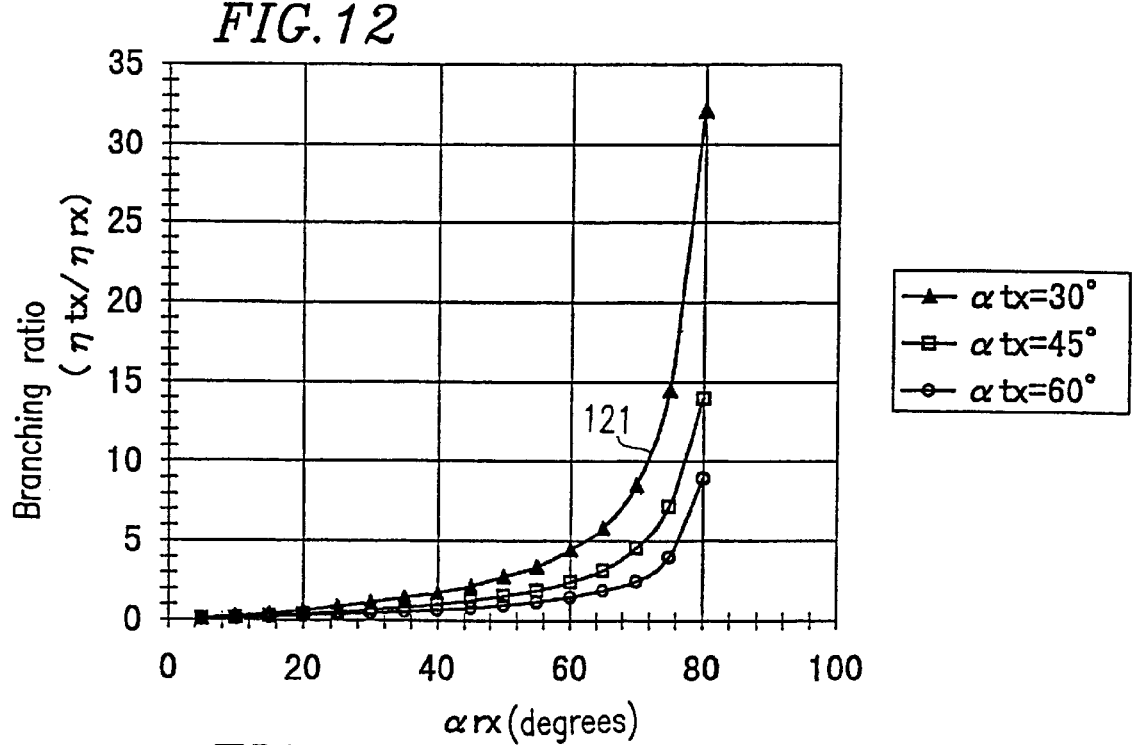
FIG. 12 is a graph illustrating the relationship between different vertex angles $\alpha tx$ and the branching ratio.
Figure 13:
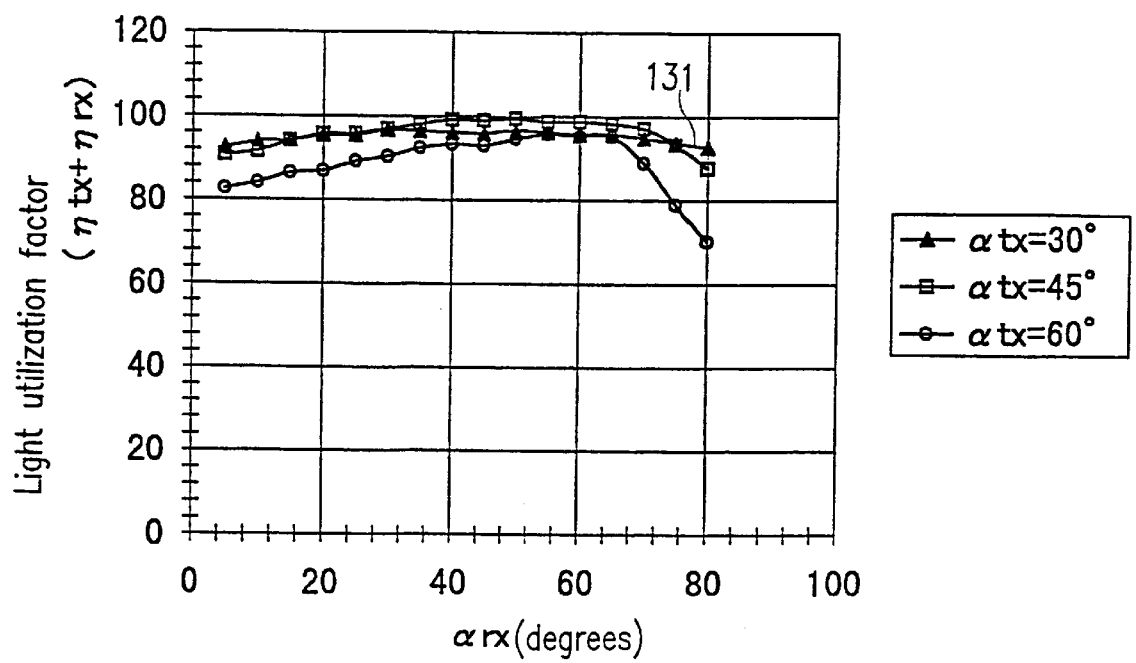
FIG. 13 is a graph illustrating the relationship between different vertex angles $\alpha tx$ and the light utilization factor.

FIG. 12 is a graph illustrating αrx vs. branching ratio relationship when αtx is 30°, 45° and 60°. FIG. 13 is a graph illustrating αrx vs. light utilization factor relationship when the when αtx is 30°, 45° and 60°. In order to realize ηtx/ηrx>1, for example, ηtx/ηrx=5, αtx is about 30° and αrx is about 60° as curve 121 in FIG. 12. In this case, the light utilization factor is about 85% or more as shown by curve 131 in FIG. 13.

Figure 31:
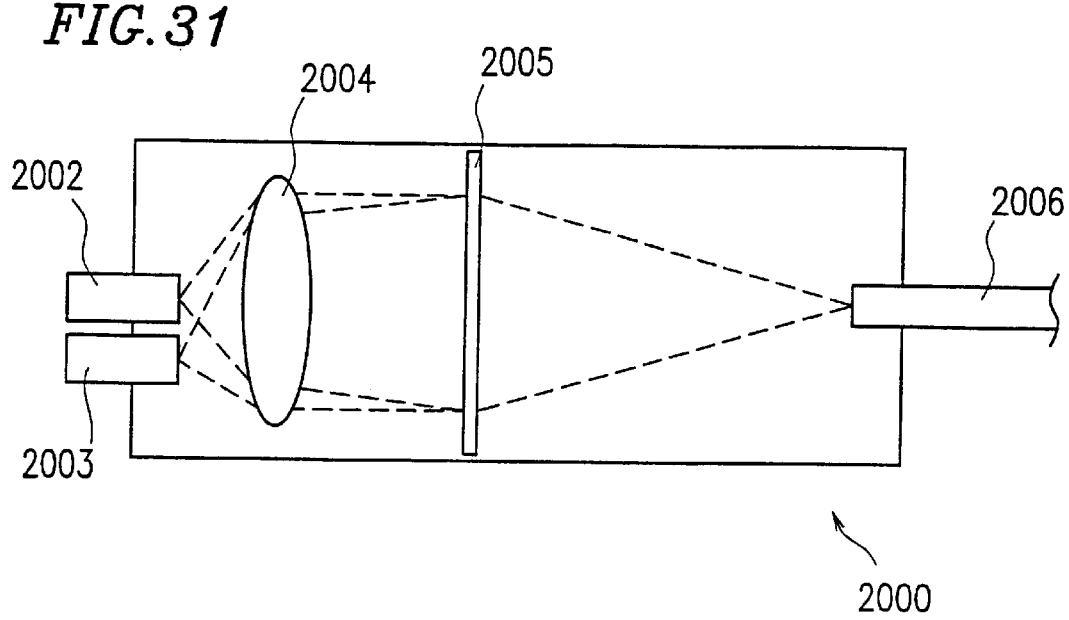
FIG. 31 is a view illustrating another conventional optical transmission and receiving module.

Pitch P of the optical transmission and receiving module 100 in FIG. 1 is larger than the pitch of the holographic diffraction grating 2005 of the optical transmission and receiving module 2000 in FIG. 31.

In the optical transmission and receiving module 2000, when, for example, the wavelength λ of light from the light source is 650 nm, the diffraction angle θ is 30°, and the pitch of the holographic diffraction grating 2005 is P, P=λ/sin θ=1.3 μm.

In the optical transmission and receiving module 100 shown in FIG. 1, when the prism 22 is formed of acrylic and has vertex angles αtx and αrx of 45°, the refraction angle of the prism 22 is about 30°. When height h2 (FIG. 3) of the prism 22 is 25 μm, pitch P is 50 μm. Under these conditions, the optical transmission and receiving module 100 can be produced more easily than the optical transmission and receiving module 2000 shown in FIG. 31.

EXAMPLE 2

Figure 14:
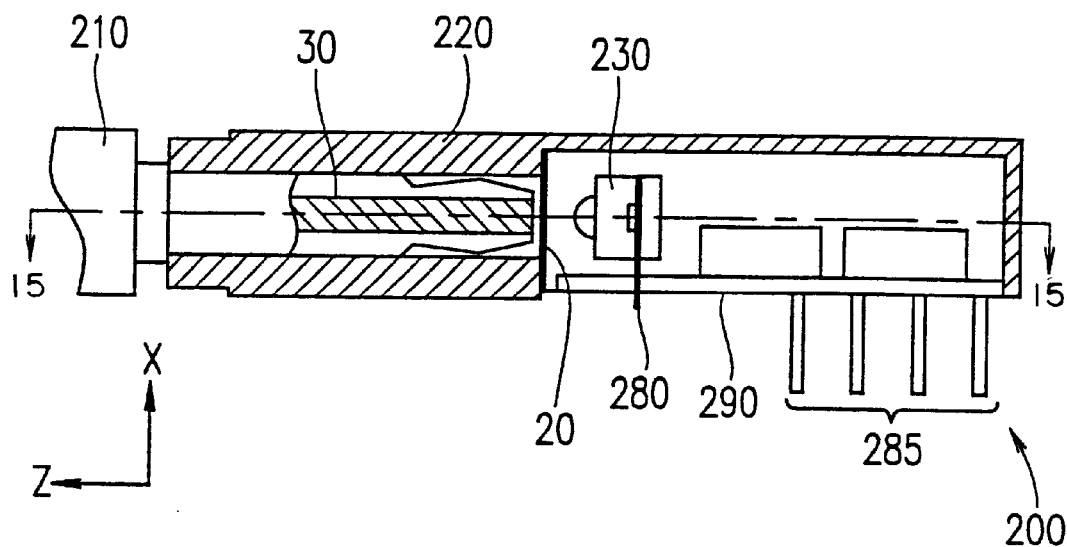
FIG. 14 is a cross-sectional view of an optical transmission and receiving module in a second example according to the present invention.
Figure 15:
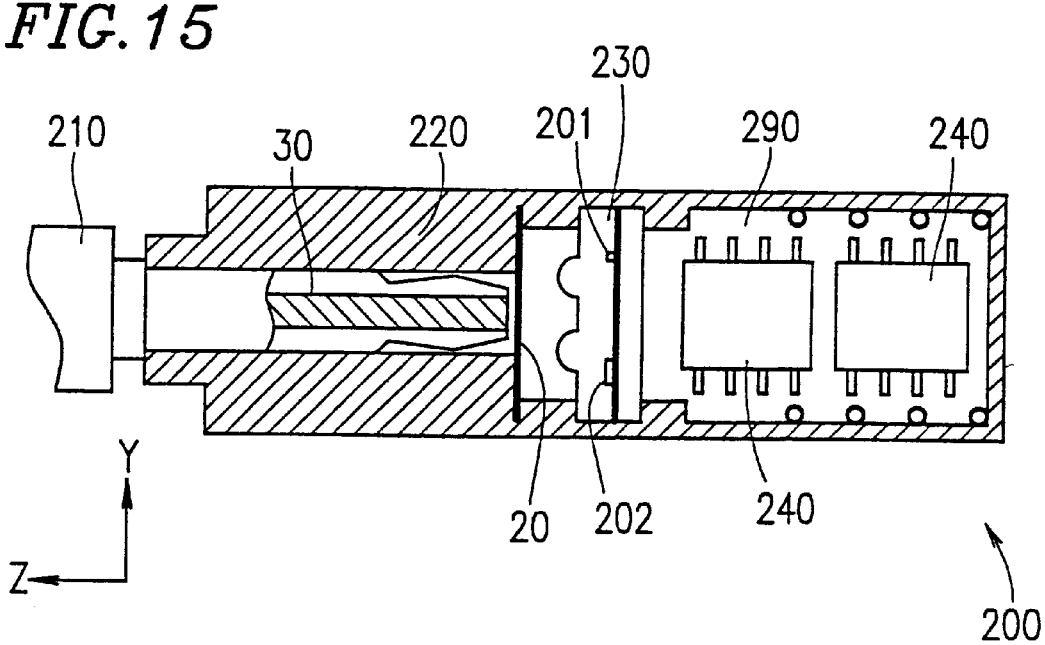
FIG. 15 is a cross-sectional view of the optical transmission and receiving module shown in FIG. 14 taken along line 15—15 of FIG. 14.

FIG. 14 is a cross-sectional view of an optical transmission and receiving module 200 in a second example according to the present invention. FIG. 15 is a cross-sectional view of FIG. 14 along line 15—15. Identical elements described with reference to FIG. 1 bear identical reference numerals and detailed descriptions thereof will be omitted.

For transmitting signals, a plug 210 having an optical fiber 30 is inserted into the optical transmission and receiving module 200. The optical fiber 30 is located to be coaxial with the plug 210.

The optical transmission and receiving module 200 includes a mold package 230 having a semiconductor light emitting chip 201 and a semiconductor light receiving chip 202 integrally molded, and a light branching element 20. The optical transmission and receiving module 200 further includes a PWB (printed wiring board) 290 having built-in ICs 240 inserted thereinto. The mold package 230, the light branching element 20 and the PWB 290 are enclosed in an external package 220.

The external package 220 has a receptacle section for maintaining the position of the plug 210, an insertion groove into which the light branching element 20 is inserted, a mold package insertion section into which the mold package 230 is inserted, and a PWB attachment section into which the PWB 290 is inserted, although these sections are not shown. The external package 220 is formed of a resin such as, for example, nylon or ABS by injection molding.

The mold package 230 including the semiconductor light emitting chip 201 and the semiconductor light receiving chip 202 is produced as follows. The semiconductor light emitting chip 201 and the semiconductor light receiving chip 202 are fixed to a lead frame 280 with silver paste or indium paste. The lead frame 280 is formed by plating silver on a copper plate. Then, the lead frame 280 is electrically connected to the semiconductor light emitting chip 201 and the semiconductor light receiving chip 202 by wire bonding. The connected lead frame 280, the semiconductor light emitting chip 201 and the semiconductor light receiving chip 202 are put into a mold and treated by transfer molding. At least two lenses (not shown) are integrally molded to be on a surface of the mold package 230.

The light branching element 20 is produced by injection-molding a transparent resin such as, for example, acrylic in a mold having an inverted shape to that of the prism array 22A (FIG. 1). The light branching element 20 is inserted into the insertion groove of the external package 220 in direction Y (FIG. 15) and secured by an adhesive.

The light branching element 20, which is also used under the name of prism sheet or the like for compensating for the luminance of the backlight of a liquid crystal display panel, is marketed by various companies and is readily available. In this example, BEF II 90/50 produced by Sumitomo 3M Limited is used. The prism sheet includes an array of acrylic isosceles triangular prisms having a vertex angle of 45° provided on a PET layer. The light branching element 20 is inserted as described above with the grooves being in direction Y.

The PWB 290 has the ICs 240 including an amplifier, a driving circuit, and demodulation and modulation circuits; a resistor (not shown) or a capacitor (not shown). A part or the entirety of the ICs 240, the resistor or capacitor can be inside the mold package 230.

The PWB 290 is inserted into the PWB attachment section of the external package 220 in direction Y and secured. Leads 285 of the mold package 230 are inserted into holes of the PWB 290, and the leads 285 are soldered to the patterns of the PWB 290 for electric connection.

An exemplary operation of the optical transmission and receiving module 200 will be described.

Receiving signal light is output from the optical fiber 30 and incident on the light branching element 20 in direction Z.

The light is then branched by the light branching element 20 into two light components tilted by about ±30° relative to direction Z. One light component is collected by the lenses on the surface of the mold package 230 and incident on the semiconductor light receiving chip 202.

The receiving signal light which is incident on the semiconductor light receiving chip 202 becomes a receiving signal current and processed by the electronic circuits on the PWB 290. The receiving signal current is then sent to a main PWB (not shown), to which the optical transmission and receiving module 200 is attached.

A transmitting signal is sent through the main PWB and the leads 285 to the semiconductor light emitting chip 201. The signal is turned into transmitting signal light by the semiconductor light emitting chip 201 and collected by the lenses on the surface of the mold package 230. The transmitting signal light is then incident on the light branching element 20 at an angle tilted by about 30° relative to direction –Z (opposite to direction Z).

The light is deflected in direction Z by the light branching element 20 and incident on the optical fiber 30. The light is then received by another device with which information is to be communicated.

Since the plug 210 is symmetrical relative to the optical axis of the optical fiber 30, it is advantageous for reducing the size of the optical transmission and receiving module 200 that the prism array of the light branching element 20 is also symmetrical relative to the optical axis of the optical fiber 30.

EXAMPLE 3

Figure 16:
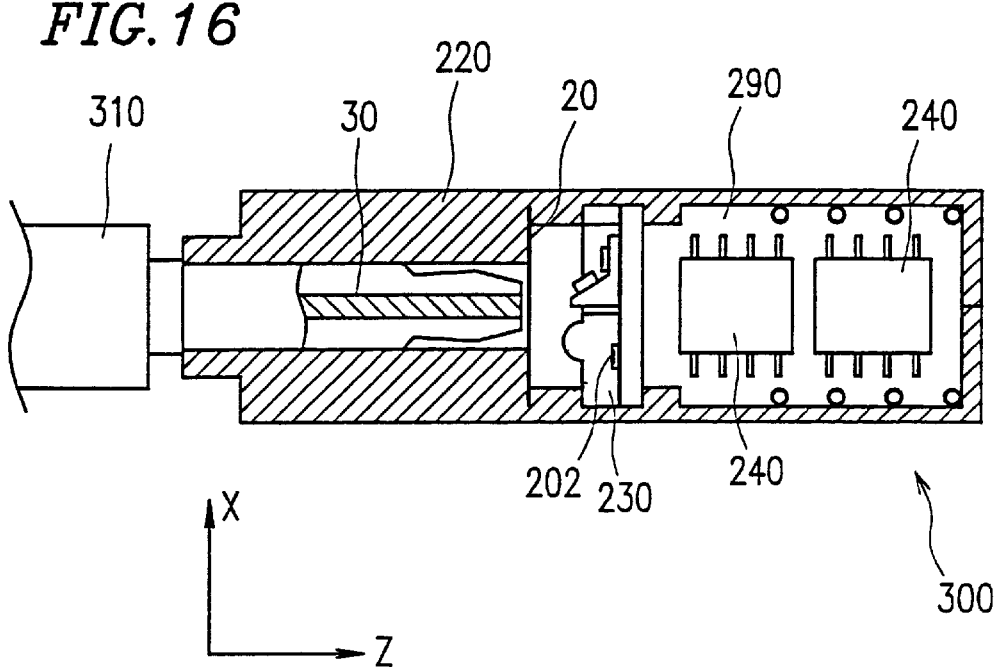
FIG. 16 is a cross-sectional view of an optical transmission and receiving module in a third example according to the present invention.
Figure 17:
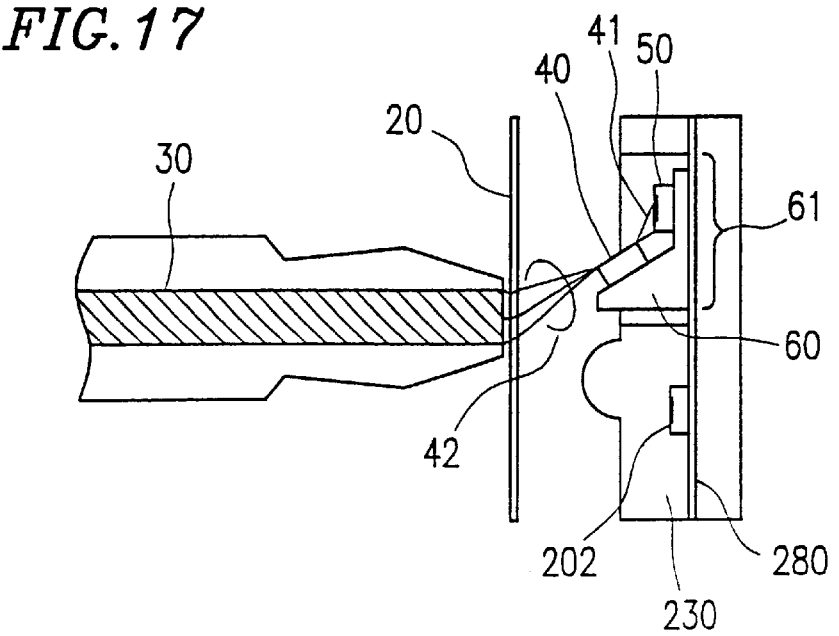
FIG. 17 is an enlarged view of an optical system of the optical transmission and receiving module shown in FIG. 16.
Figure 18A:
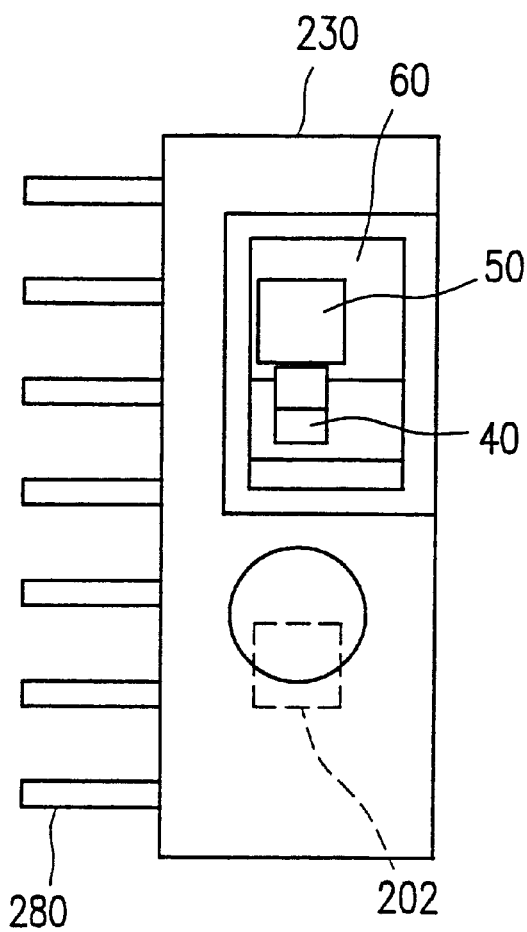
FIGS. 18A, 18B and 18C are respectively a side view, a plan view and a front view of a mold package of the optical transmission and receiving module shown in FIG. 16.
Figure 18B:
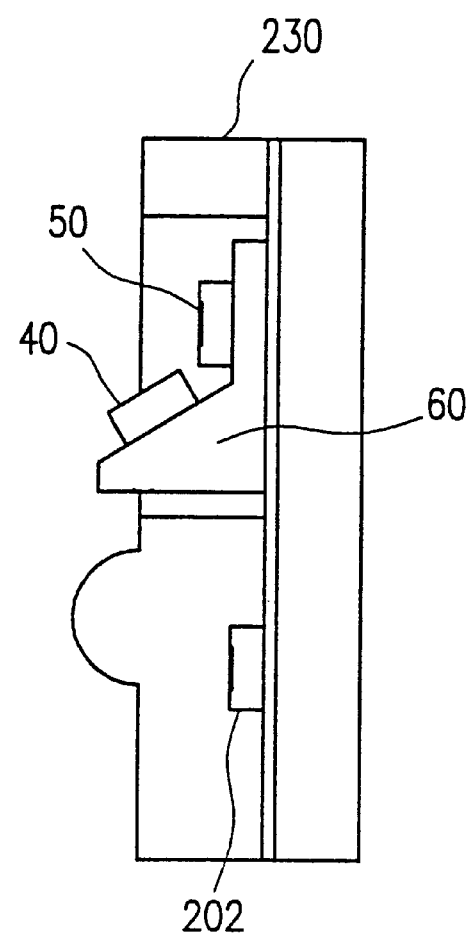
Figure 18C:
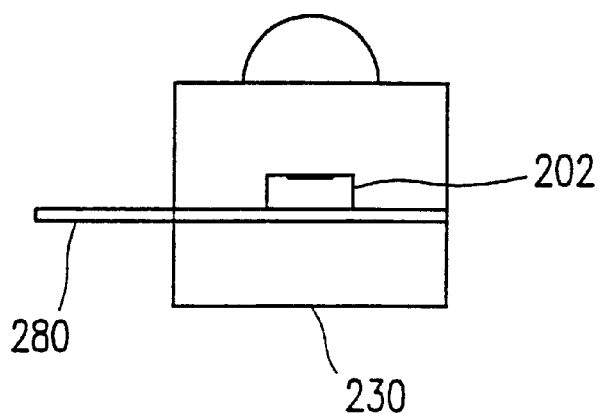

FIG. 16 is a cross-sectional view of an optical transmission and receiving module 300 in a third example according to the present invention. FIG. 16 shows the cross-section cut in the same direction as FIG. 15, and shows the state in which a plug 310 having an optical fiber 30 is inserted into the optical transmission and receiving module 300. FIG. 17 is an enlarged view of an optical system of the optical transmission and receiving module 300. FIGS. 18A, 18B and 18C are respectively a side view, a plan view and a front view of a mold package 230 (FIG. 16). Identical elements described in the previous examples bear identical reference numerals and detailed descriptions thereof will be omitted.

The optical transmission and receiving module 300 includes a semiconductor laser diode (LD) 40 as a light emitting element in place of the light emitting diode (LED) used in the optical transmission and receiving module 100 in the first example. The optical transmission and receiving module 300 will be described regarding the differences from the optical transmission and receiving module 100.

With reference to FIGS. 16 and 17, an LD assay 61 is produced in the following manner.

A sub mount 60 is formed by cutting a ceramic body of aluminum oxide or the like into a prescribed shape. An electrode of gold, aluminum or the like is formed on a surface of the sub mount 60. The semiconductor LD 40 and an LD light monitoring photo detector (MPD) 50 of a gold-tin alloy are fixed on the electrode with wax. The semiconductor LD 40 and an LD light MPD 50 are electrically connected to the sub mount 60 by wire bonding. The resultant LD assay 61 is tested, and the production is completed.

With reference to FIGS. 18A, 18B and 18C, the mold package 230 is produced in the following manner.

A lead frame 280 is formed by plating silver on a copper plate. A semiconductor light receiving chip 202 is fixed on the lead frame 280 with silver paste or the like, and electrically connected to the lead frame 280 by wire bonding. The lead frame 280 and the semiconductor light receiving chip 202 are put into a mold and treated by transfer molding. A lens is integrally formed on a surface of the mold package 230. The LD assay 61 is fixed on the lead frame 280 with indium paste or the like. Thus, the mold package 230 is completed.

With reference to FIG. 17, an exemplary operation of the optical transmission and receiving module 300 will be described.

A rear component 41 of the laser light from the semiconductor LD 40 is incident on the LD light MPD 50 and becomes a control signal for controlling a semiconductor laser driving circuit (not shown). A front component 42 of the laser light (transmitting signal light) is incident on the light branching element 20 and deflected. Then, the deflected light is incident on the optical fiber 30 and received by another device with which information is to be communicated.

EXAMPLE 4

Figure 20:
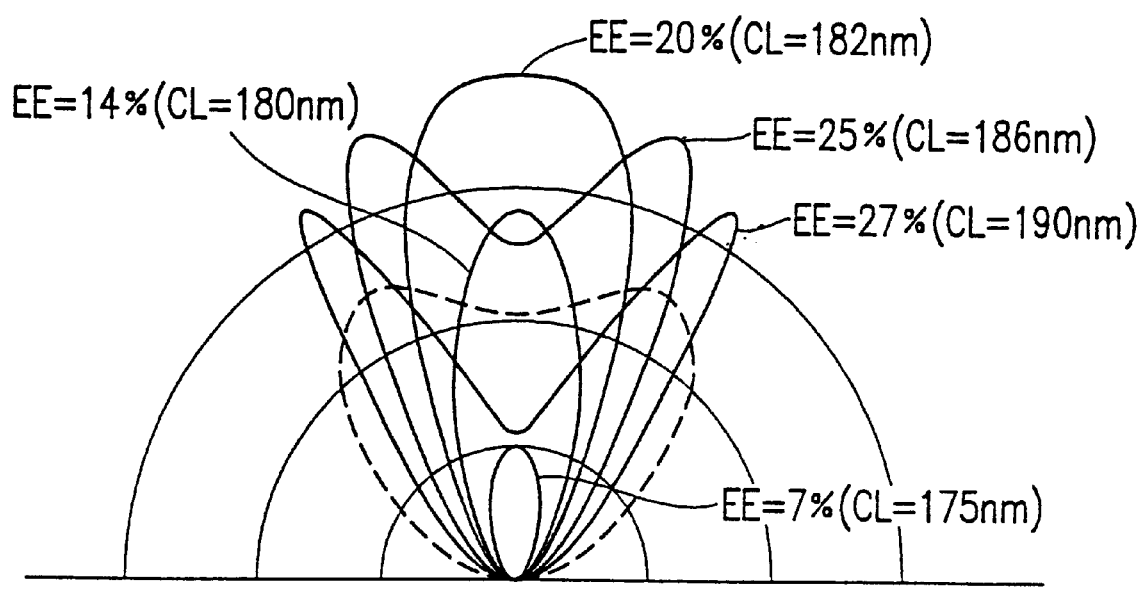
FIG. 20 is a diagram illustrating the radiation characteristic of RCLEDs with different light-electricity conversion efficiencies.

With reference to FIGS. 19 and 20, a fourth example according to the present invention will be described. It has been studied to provide a conventional light emitting diode (LED) with a resonant cavity structure to improve the characteristics thereof (light-electricity conversion efficiency, wavelength half-width, radiation half-width, response speed and the like) as described in, for example, "Spontaneous emission control diode", OPTRONICS (1993, No. 4). As such a type of LEDs, RCLEDs have recently been mass-produced.

FIG. 19 shows an exemplary cross-section of an RCLED 400 which is usable for an optical transmission and receiving module according to the present invention. As shown in FIG. 19, the RCLED 400 includes an electrode 420, a DBR (distributed Bragg reflector) layer 450, a DH (double heterostructure) layer 440, another DBR layer 430, and an electrode 410 which are sequentially laminated in this order.

FIG. 20 is a diagram illustrating the radiation characteristic of RCLEDs with different light-electricity conversion efficiencies. In FIG. 20, EE indicates the light-electricity conversion efficiency, and CL indicates the length of the resonant cavity. An RCLED is advantageous in improving the above-mentioned characteristics, but has a problem in that, as shown in FIG. 20, the peak radiation position is offset from the front of the RCLED when designed to improve the light-electricity conversion efficiency EE. The peak radiation angle φ (angle at which the EE is at the peak) is controllable by changing the design of the resonator since the φ=cos−(λe/λo), where λe is the wavelength of the light emitted by the light emitting layer and λo is the transmitted peak wavelength of the light from the resonator of the light emitting element.

The above-described problem of the RCLED can be compensated for by making deflection angle Θ of a light branching element equal to the peak radiation angle φ. Thus, the light utilization factor is improved. This is also applicable to the conventional optical transmission and receiving module 2000 shown in FIG. 31.

The radiation characteristic shown in FIG. 20 is of one cross-section of the RCLEDs. Since the actual radiation characteristic is a three-dimensional characteristic obtained by rotating the characteristic shown in FIG. 20 around the Z axis, the light utilization factor is, more precisely, maximized when the peak radiation angle φ is in the vicinity of the deflection angle Θ instead of being exactly equal to the deflection angle Θ. The value of the deflection angle Θ at which the light utilization factor is maximized can easily be calculated by a ray tracing method.

As described above, the energy of the light radiation can be utilized to the maximum by making the deflection of the light branching element substantially equal to the peak radiation angle of the light from the light emitting element.

EXAMPLE 5

Figure 21:
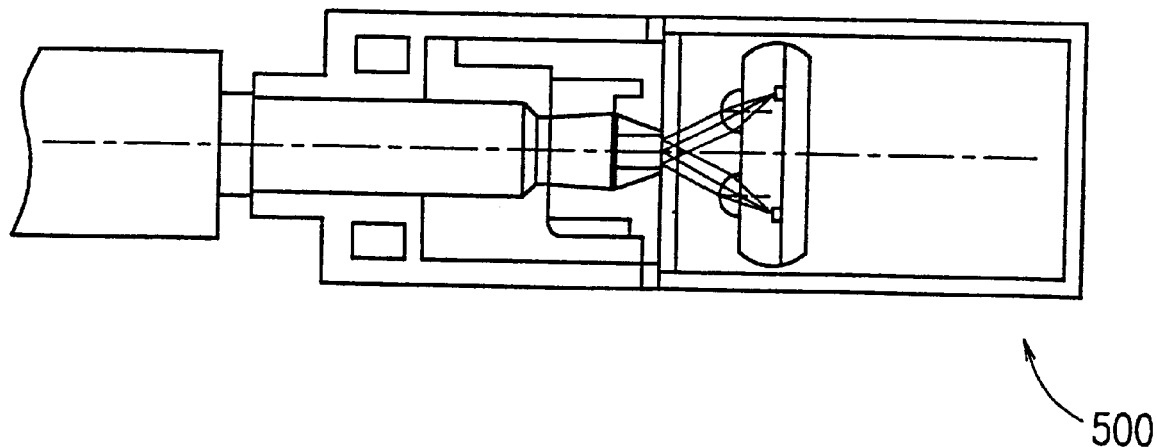
FIG. 21 is a plan view of an optical system of an optical transmission and receiving module in a fifth example according to the present invention.
Figure 22:
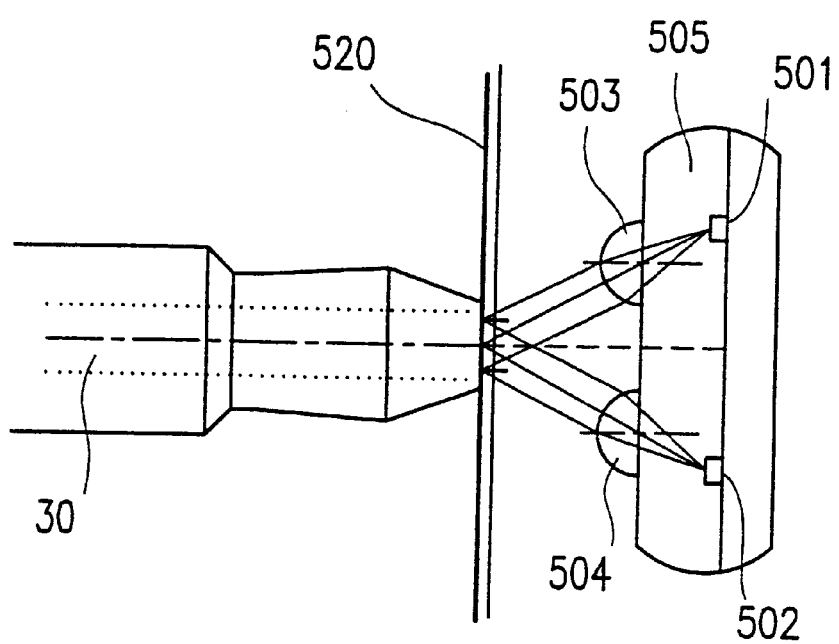
FIG. 22 is an enlarged view of the optical system of the optical transmission and receiving module shown in FIG. 21.

FIG. 21 is a plan view of an optical transmission and receiving module 500 in a fifth example according to the preset invention. In FIG. 21, a plug having an optical fiber is inserted the optical transmission and receiving module 500. FIG. 22 is an enlarged view of an optical system of the optical transmission and receiving module 500.

The optical transmission and receiving module 500 includes a light emitting element 501 including a collection lens (not shown) and a light receiving element 502 including a collection lens (not shown). The light emitting element 501 and a light receiving element 502 are mounted on a single PWB.

The light emitting element 501 and the light receiving element 502 are sealed with an epoxy-based resin 505. Preferably used is a climate resistant epoxy-based resin, for example, CEL-T-2000 produced by Hitachi Chemical Co., Ltd. On the resin sealing material, collection lenses 503 and 504 are formed.

The optical transmission and receiving module 500 operates in the following manner.

The transmitting light which is output from the light emitting element 501 and transmitted through the lens 503 is incident on and refracted by a prism array 520 and then incident on an optical fiber 30. The receiving light from the optical fiber 30 is incident on and refracted by the prism array 520 and then collected by the light receiving element 502 through the collection lens 504.

Figure 23:
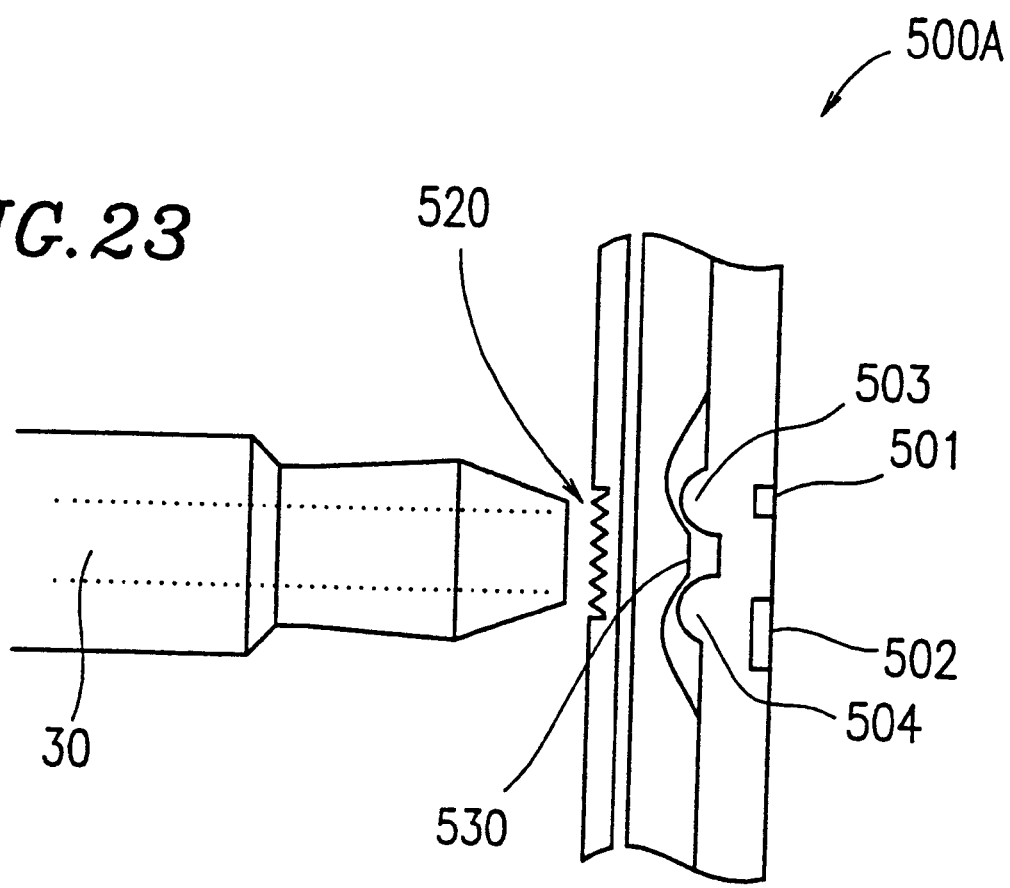
FIG. 23 is a view illustrating a modification of the optical transmission and receiving module shown in FIG. 21.

FIG. 23 shows an optical transmission and receiving module 500A which is a modification of the optical transmission and receiving module 500 shown in FIGS. 21 and 22.

A collimator lens 530 is provided between the collection lenses 503 and 504 associated with the light emitting element 501 and the light receiving element 502. The collimator lens 530 is provided parallel to the prism array 520. The collimator lens can be spherical or nonspherical. In this example, the collimator lens 530 is spherical.

The light emitting element 501, the light receiving element 502, and the lenses 503 and 504 are integrally formed by injection molding or the like. A preferable material for the sealing and the lenses 503 and 504 is a highly climate resistant material, for example, CEL-T-2000 mentioned above or ARTON-F produced by Japan Synthetic Rubber Co., Ltd. It is preferable to produce a mold in such a manner that the periphery of the collimator lens 530 is tapered for easier processing.

The optical transmission and receiving module 500A operates in the following manner.

Transmitted light which is output from the light emitting element 501 and transmitted through the collection lens 503 is collimated by the collimator lens 530 and then is incident on and refracted by the prism array 520. The light is then incident on the optical fiber 30. The receiving light from the optical fiber 30 is refracted by the prism array 520 and then collimated by the collimator lens 530. Then, the light is collected by the light receiving element 502 through the collection lens 504. Thus, the light is incident on the prism array 520 after being collimated. Therefore, the light coupling efficiency is improved both for light transmission and reception by providing the collimator lens 530 between the light transmitting element 501 and the light receiving element 502.

EXAMPLE 6

Figure 24:
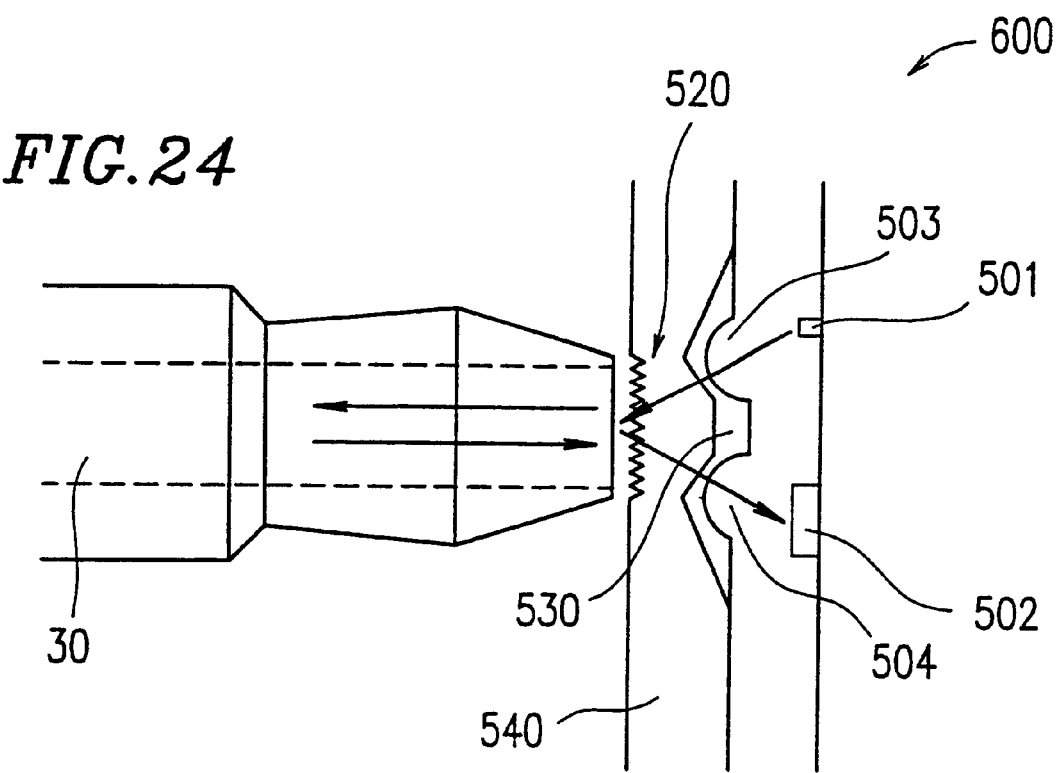
FIG. 24 is a view illustrating an optical transmission and receiving module in a sixth example according to the present invention.

FIG. 24 shows an optical transmission and receiving module 600 in a sixth example according to the present invention. The optical transmission and receiving module 600 includes an integration optical element 540 including the collimator lens 530 and the prism array 520 which are integrated with the light emitting element 501, the light receiving element 502 and the collection lenses 503 and 504. The integration optical element 540 is produced by injection molding using a highly climate resistant material such as mentioned in the fifth example. It is preferable to produce a mold in such a manner that the periphery of the collimator lens 530 is tapered for easier processing.

The optical transmission and receiving module 600 can be produced with a smaller number of components than the optical transmission and receiving modules 500A.

Furthermore, since the Fresnel reflection caused between the collimator lens 530 and the prism array 520 is reduced, the light coupling efficiency is improved both for light transmission and reception.

EXAMPLE 7

Figure 25:
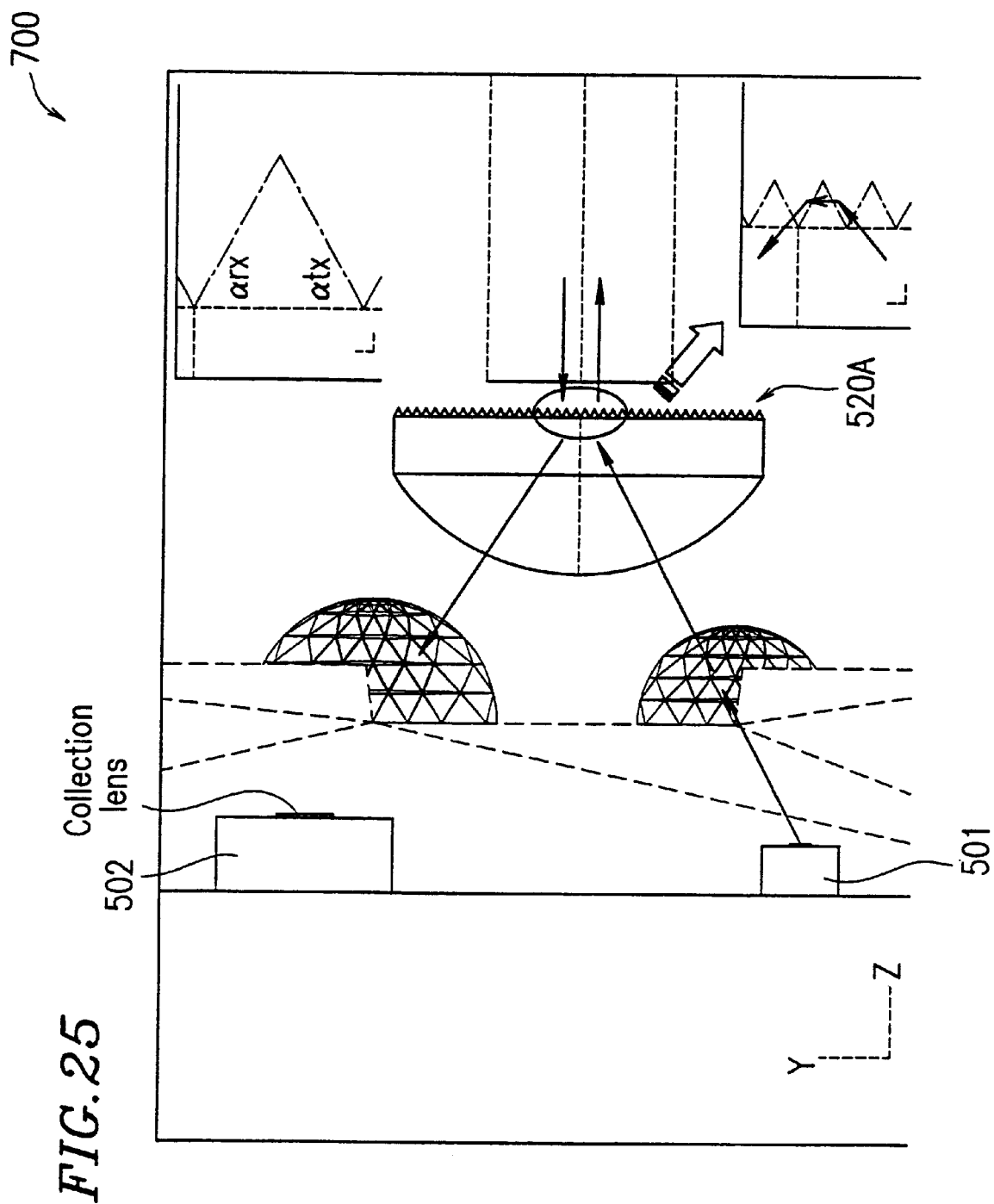
FIG. 25 is a view illustrating an optical transmission and receiving module in a seventh example according to the present invention.

FIG. 25 shows an optical transmission and receiving module 700 in a seventh example according to the present invention. In the optical transmission and receiving module 700, a prism array 520A in the integration optical element 540 has vertex angles $\alpha tx$ (toward which the transmitting light is transmitted) and $\alpha rx$ (from which the receiving light is received) which are different from each other. Considering that the loss at the prism array 520A is minimized at $\alpha tx=\alpha rx$, the difference between the $\alpha tx$ and $\alpha rx$ are preferably minimized.

Figure 26:
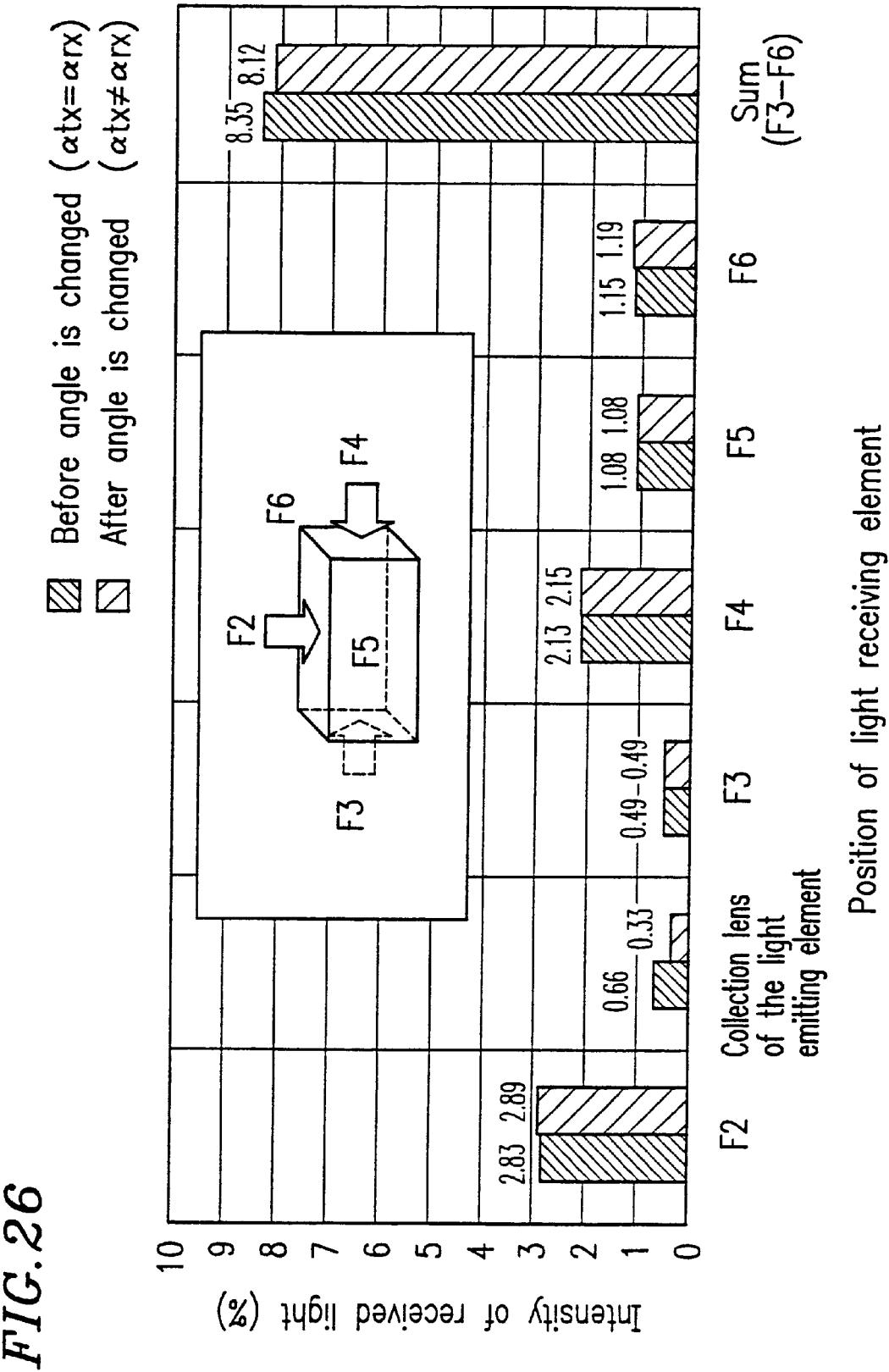
FIG. 26 is a graph illustrating the intensity of light received at various positions of a light receiving element of the optical transmission and receiving module in the seventh example when $\alpha tX=\alpha rX=60°$, and when $\alpha tX=60°$ and $\alpha rX=65°$.

FIG. 26 is a graph illustrating the intensity of the light received at various positions of the light receiving element 502 when $\alpha tx=\alpha rx=60°$ and when $\alpha tx=60°$ and $\alpha rx$ is $65°$. In the box of FIG. 26, the transmitted light is propagated in the direction of F4. The intensity of the light received by the collection light of the light receiving element 502 can be reduced to about half by setting $\alpha tx$ and $\alpha rx$ at different values.

EXAMPLE 8

Figure 27:
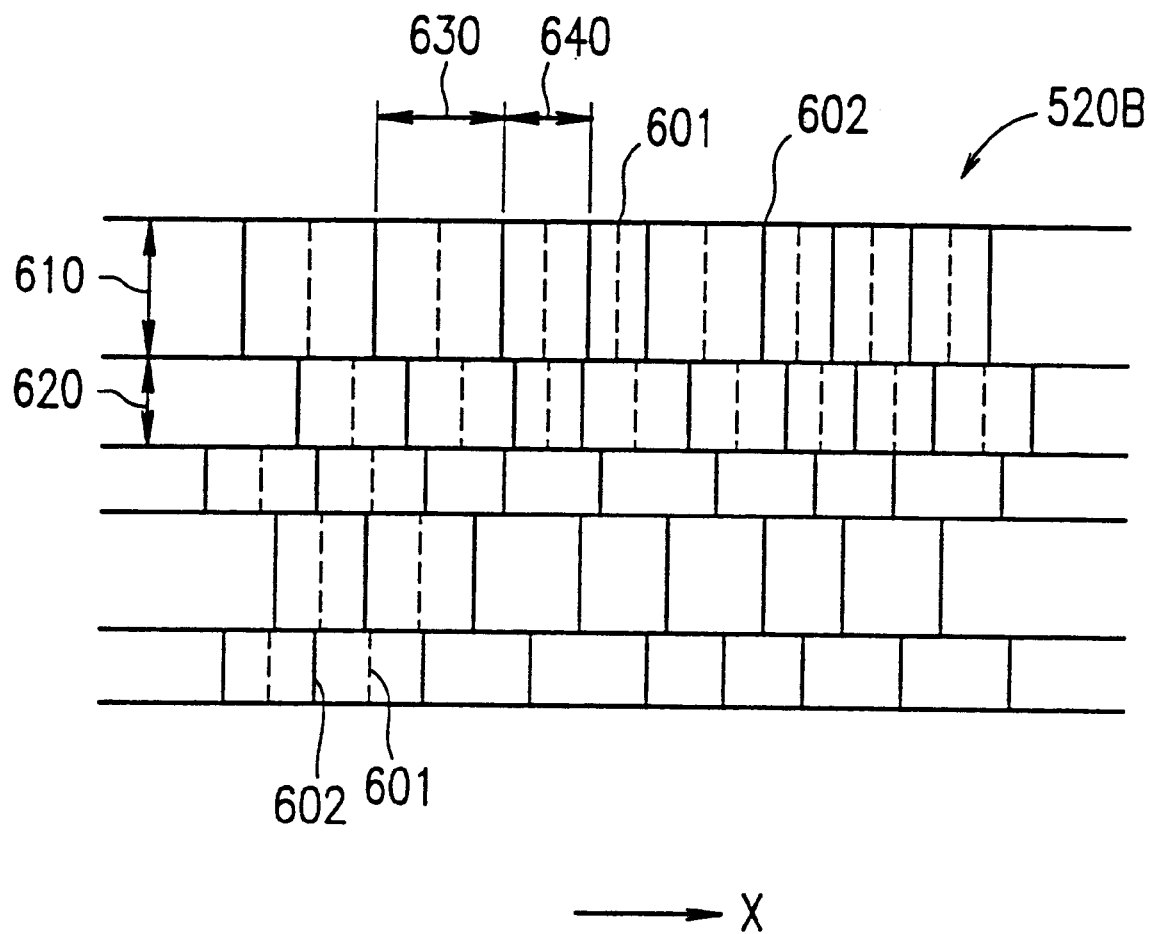
FIG. 27 is a view illustrating a prism array of an optical transmission and receiving module in an eighth example according to the present invention.
Figure 28:
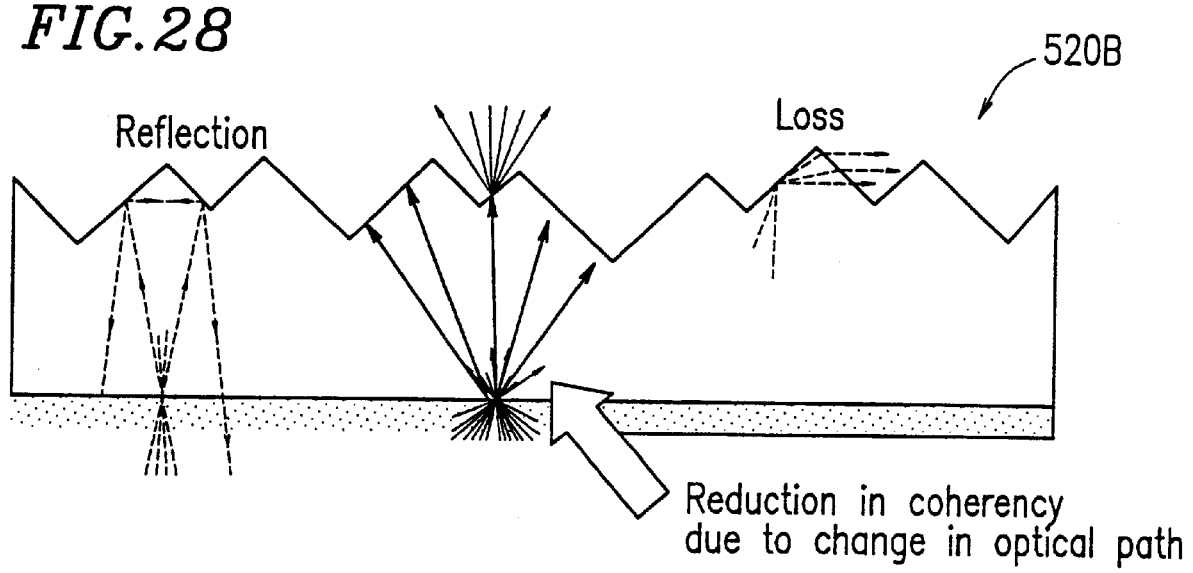
FIG. 28 is a view illustrating a prism array in the eighth example, showing the reduction in the coherency of the light from the optical module.

With reference to FIGS. 27 and 28, an eighth example according to the present invention will be described. The prism array 520B in the integration optical element 540 as in the sixth example is divided into a plurality of prism sections by lines perpendicular thereto (divided by lines in direction X). The plurality of prism sections have different lengths as represented by, for example, reference numerals 610 and 620 in FIG. 27. The pitch of the prisms are made random as represented by reference numerals 630 and 640 in FIG. 27. In FIG. 27, solid line 601 represents troughs and dashed line 602 represents ridges. The lengths of the troughs 601 and the peaks 602 in different prism sections are different from one another. The troughs 601 and the peaks 602 are also positionally offset on a prism section-by-prism section basis. As shown in FIG. 28, the coherency of the light which is output from the optical transmission and receiving module can be reduced since the light rays transmitted through the integration optical element 540 are propagated along optical paths of different lengths.

EXAMPLE 9

Figure 29:
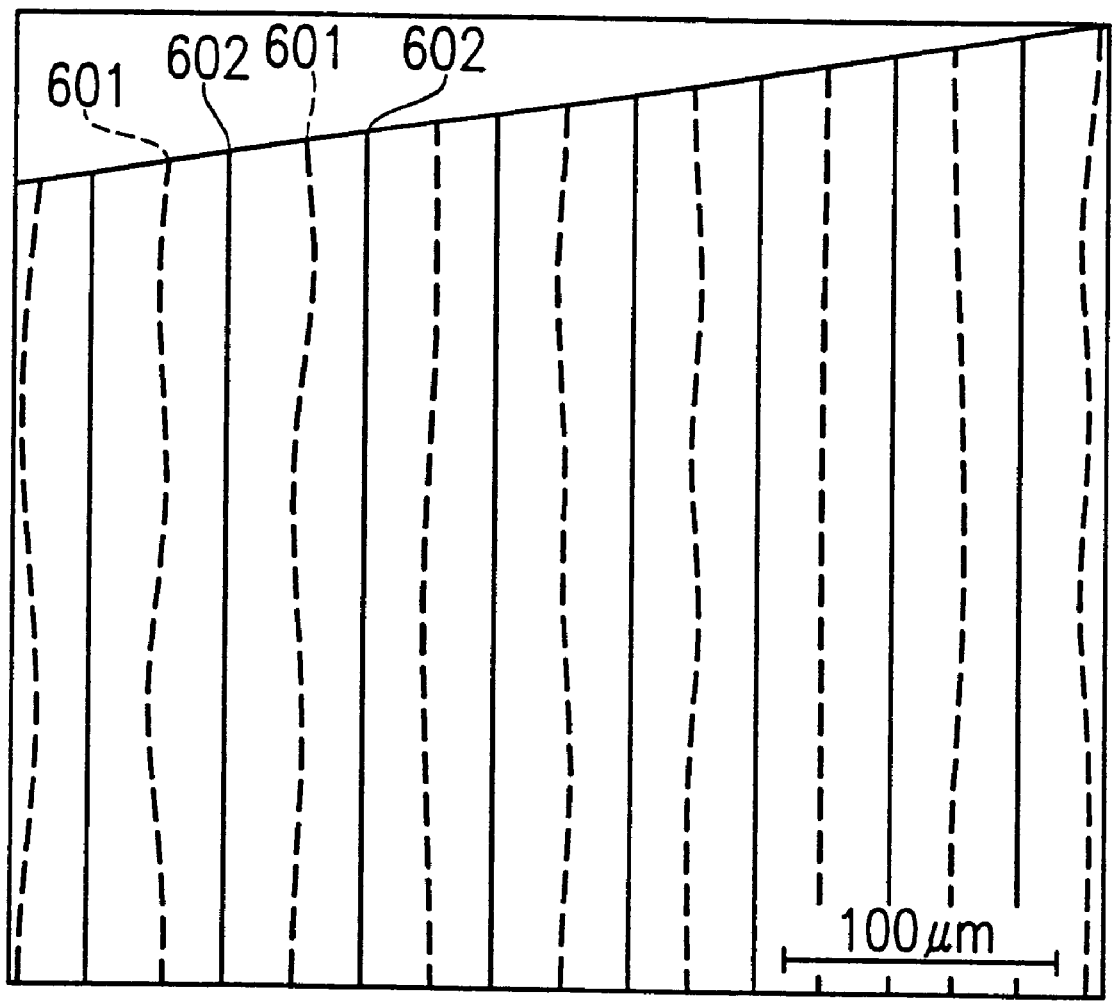
FIG. 29 is a plan view of a prism array of an optical transmission and receiving module in a ninth example according to the present invention.

FIG. 29 is a plan view of a prism array 520C of an optical transmission and receiving module in a ninth example according to the present invention.

In this example, the height of the peaks 602 and the depth of the troughs 601 of the prism array 520C are made random. Such a structure also reduces the coherency.

According to the present invention, the light branching element includes a prism array including a plurality of triangular prisms arranged at substantially an identical pitch on a plane extending substantially perpendicular to an imaginary line connecting the light source and the light receiving element. As long as the pitch is substantially identical, it is not necessary to precisely determine the positions of the prisms. The optical transmission and receiving module according to the present invention has a larger pitch than the conventional module and thus is easier to produce.

In the embodiment in which the optical transmission and receiving module fulfills $d/2>P>>\lambda/\sin\theta$ where d is the diameter of the optical fiber, $\lambda$ is the wavelength of the light from the light source, P is the pitch, and $\theta$ is the deflection angle; the optical transmission and receiving module is not significantly influenced by a change in the wavelength of the light from the light source or a positional offset of the components. Thus, the optical transmission and receiving module has a satisfactory light utilization factor and also is relatively easy to produce.

In the embodiment in which the prisms have an isosceles triangular cross-section, the optical transmission and receiving module can be reduced in size.

In the embodiment in which the vertex angle of the prisms is in the range of about $-20°$ to about $60°$, the light utilization factor, i.e., the sum of the transmittance $\eta tx$ when the light is transmitted and the transmittance $\eta rx$ when the light is received can be increased to about 85% or more.

In the embodiment in which the optical transmission and receiving module fulfills:

$$1/\tan(1/\alpha tx)=1/\tan(1/\alpha rx)+\tan(\alpha rx-\arc\sin(\alpha rx/n))$$

where $\alpha tx$ and $\alpha rx$ are vertex angles of the prism, and n is the refractive index of the prism, the light utilization factor of the communication between the modules of the same type can be increased.

In the embodiment in which the deflection angle of the light branching element and the peak radiation angle of the light emitting element formed of an RCLED are substantially equal to each other, the problem of the RCLED is compensated for and thus the light utilization factor is improved. Accordingly, the higher speed long distance light communication can be realized than can be realized by the conventional module including an LED as the light emitting element. Such an optical transmission and receiving module can be used with IEEE1394 and USB2.

In the embodiment in which a collimator lens is provided between the light emitting and receiving elements and the prism array, the transmitting light and the receiving light are collimated by the collimator lens before being incident on the optical fiber or received by the light receiving element. Accordingly, the light coupling efficiency is increased, and the tolerance for the positional offset for mounting is increased.

In the embodiment in which the prism array and the collimator lens are integrally formed, the number of components is decreased, and the loss caused by the Fresnel reflection between the prism array and the collimator lens can be reduced.

The light which is output from the light emitting element and reflected by the Fresnel reflection at an interface between the prism array and air is prevented from being directly coupled to the light receiving element.

Even when light from the optical transmission and receiving module according to the present invention directly enters the user's eye, the damage to the retina is relatively small since the light spot has a large diameter due to the small coherency. That is, the prism array is provided with a function as a so-called eye-safety device.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical transmission and receiving module, comprising:

a light source;

a light receiving element; and a light branching element for causing signal light from the light source to be incident on an optical fiber and causing signal light output from the optical fiber to be incident on the light receiving element, wherein the light branching element includes a prism array including a plurality of triangular prisms arranged at substantially an identical pitch on a plane extending substantially perpendicular to an imaginary line connecting the light source and the light receiving element.

2. An optical transmission and receiving module according to claim 1, which fulfills d/b 222 P>>λ/sin θ where d is a diameter of the optical fiber, λ is a wavelength of light from the light source, P is a pitch of the plurality of triangular prisms, and θ is a deflection angle of the plurality of triangular prisms.

3. An optical transmission and receiving module according to claim 1, wherein each of the plurality of triangular prisms has an isosceles triangular cross-section.

4. An optical transmission and receiving module according to claim 3, wherein each of the plurality of triangular prisms has a vertex angle in the range of about −20° to 60°.

5. An optical transmission and receiving module according to claim 1, which fulfills:

$$1/\tan(1/\alpha tx)=1/\tan(1/\alpha rx)+\tan(\alpha rx-\arcsin(\alpha rx/n))$$

where $\alpha tx$ is one vertex angle, $\alpha rx$ is another vertex angle, and n is the refractive index of each of the plurality of triangular prisms.

6. An optical transmission and receiving module according to claim 1, which fulfills Φ>B where Φ is the diameter of the signal light output from the optical fiber to the prism array, and B is the length of a base of each of the plurality of triangular prisms.

7. An optical transmission and receiving module according to claim 1, wherein the prism array is formed of acrylic.

8. An optical transmission and receiving module according to claim 1, wherein the light source includes a light emitting element which is formed of a semiconductor laser element.

9. An optical transmission and receiving module according to claim 1, wherein the light source includes a light emitting element which is formed of a resonant cavity light emission diode.

10. An optical transmission and receiving module according to claim 5, wherein the light source includes a light emitting element, and a deflection angle of the light branching element and a peak radiation angle of radiation light from the light emitting element are substantially equal to each other.

11. An optical transmission and receiving module according to claim 1, wherein:

the light source includes a light emitting element, the light emitting element includes a first collection lens, the light receiving element includes a second collection lens, and the optical transmission and receiving module further includes at least one collimator lens provided between the prism array, and the first collection lens and the second collection lens, the at least one collimator lens being parallel to the prism array.

12. An optical transmission and receiving module according to claim 11, wherein the prism array and the collimator lens are integrally formed.

13. An optical transmission and receiving module according to claim 1, wherein a vertex angle $\alpha tx$ is different from $\alpha rx$, where $\alpha tx$ is one vertex angle and $\alpha rx$ is another vertex angle of each of the plurality of triangular prisms.

14. An optical transmission and receiving module according to claim 2, wherein:

the prism array is divided into a plurality of prism sections by lines perpendicular to troughs and peaks thereof, and the troughs and peaks are positionally offset on a prism section-by-prism section basis.

15. An optical transmission and receiving module according to claim 14, wherein the troughs and peaks in different prism sections have different lengths from one another.

16. An optical transmission and receiving module according to claim 2, wherein the prism array includes troughs having random depth and peaks having random heights.

* * * * *